US011935495B2

(12) United States Patent
Chen et al.

(10) Patent No.: US 11,935,495 B2
(45) Date of Patent: Mar. 19, 2024

(54) METHODS FOR DRIVING ELECTRO-OPTIC DISPLAYS

(71) Applicant: E Ink Corporation, Billerica, MA (US)

(72) Inventors: Aaron Chen, Watertown, MA (US); Teck Ping Sim, Acton, MA (US); Kenneth R. Crounse, Somerville, MA (US); Karl Raymond Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 17/890,312

(22) Filed: Aug. 18, 2022

(65) Prior Publication Data

US 2023/0056258 A1 Feb. 23, 2023

Related U.S. Application Data

(60) Provisional application No. 63/336,331, filed on Apr. 29, 2022, provisional application No. 63/234,295, filed on Aug. 18, 2021.

(51) Int. Cl.
*G09G 3/34* (2006.01)

(52) U.S. Cl.
CPC .................................. *G09G 3/344* (2013.01)

(58) Field of Classification Search
CPC ........... G09G 3/344; G09G 2310/0254; G09G 2320/0204; G09G 2320/0257; G09G 2340/16
See application file for complete search history.

(56) References Cited

U.S. PATENT DOCUMENTS 4,418,346 A 11/1983 Batchelder
5,760,761 A 6/1998 Sheridon
(Continued)

FOREIGN PATENT DOCUMENTS

WO 1999067678 A2 12/1999
WO 2000005704 A1 2/2000
WO 2000038000 A1 6/2000

OTHER PUBLICATIONS

Korean Intellectual Property Office, "International Search Report and Written Opinion", PCT/US2022/040697, dated Dec. 5, 2022.
(Continued)

*Primary Examiner* — Amare Mengistu
*Assistant Examiner* — Gloryvid Figueroa-Gibson
(74) *Attorney, Agent, or Firm* — Jason P. Colangelo

(57) ABSTRACT

Methods are described for driving an electro-optic display having a plurality of display pixels. Each of the display pixels is associated with a display transistor. The method includes the following steps in order. A first voltage is applied to a first display transistor associated with a first display pixel of the plurality of display pixels. The first voltage is applied during at least one frame of a driving waveform. A second voltage is applied to the first display transistor associated with the first display pixel. The second voltage has a non-zero amplitude less than the first voltage and is applied during the last frame of the driving waveform. The amplitude of the second voltage is based on a voltage offset value and a sum of remnant voltages each frame of the driving waveform contributes to the first display pixel when the first voltage is applied to the first display transistor.

17 Claims, 17 Drawing Sheets

(56) References Cited

U.S. PATENT DOCUMENTS

| | | | |
|---|---|---|---|
| 5,777,782 | A | 7/1998 | Sheridon |
| 5,808,783 | A | 9/1998 | Crowley |
| 5,872,552 | A | 2/1999 | Gordon, II et al. |
| 5,930,026 | A | 7/1999 | Jacobson et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,097,531 | A | 8/2000 | Sheridon |
| 6,124,851 | A | 9/2000 | Jacobson |
| 6,128,124 | A | 10/2000 | Silverman |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,252,564 | B1 | 6/2001 | Albert et al. |
| 6,271,823 | B1 | 8/2001 | Gordon, II et al. |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,376,828 | B1 | 4/2002 | Comiskey |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,489 | B1 | 9/2002 | Jacobson et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,545,291 | B1 | 4/2003 | Amundson et al. |
| 6,639,578 | B1 | 10/2003 | Comiskey et al. |
| 6,657,772 | B2 | 12/2003 | Loxley |
| 6,664,944 | B1 | 12/2003 | Albert et al. |
| D485,294 | S | 1/2004 | Albert |
| 6,672,921 | B1 | 1/2004 | Liang et al. |
| 6,683,333 | B2 | 1/2004 | Kazlas et al. |
| 6,704,133 | B2 | 3/2004 | Gates et al. |
| 6,724,519 | B1 | 4/2004 | Comiskey et al. |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,825,068 | B2 | 11/2004 | Denis et al. |
| 6,825,970 | B2 | 11/2004 | Goenaga et al. |
| 6,831,769 | B2 | 12/2004 | Holman et al. |
| 6,842,279 | B2 | 1/2005 | Amundson |
| 6,842,657 | B1 | 1/2005 | Drzaic et al. |
| 6,865,010 | B2 | 3/2005 | Duthaler et al. |
| 6,866,760 | B2 | 3/2005 | Paolini, Jr. et al. |
| 6,870,657 | B1 | 3/2005 | Fitzmaurice et al. |
| 6,873,452 | B2 | 3/2005 | Tseng et al. |
| 6,900,851 | B2 | 5/2005 | Morrison et al. |
| 6,909,532 | B2 | 6/2005 | Chung et al. |
| 6,922,276 | B2 | 7/2005 | Zhang et al. |
| 6,950,220 | B2 | 9/2005 | Abramson et al. |
| 6,967,640 | B2 | 11/2005 | Albert et al. |
| 6,980,196 | B1 | 12/2005 | Turner et al. |
| 6,982,178 | B2 | 1/2006 | LeCain et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,012,735 | B2 | 3/2006 | Honeyman |
| 7,023,420 | B2 | 4/2006 | Comiskey et al. |
| 7,030,412 | B1 | 4/2006 | Drzaic et al. |
| 7,034,783 | B2 | 4/2006 | Gates et al. |
| 7,061,166 | B2 | 6/2006 | Kuniyasu |
| 7,061,662 | B2 | 6/2006 | Chung et al. |
| 7,072,095 | B2 | 7/2006 | Liang et al. |
| 7,075,502 | B1 | 7/2006 | Drzaic et al. |
| 7,075,703 | B2 | 7/2006 | O'Neil et al. |
| 7,106,296 | B1 | 9/2006 | Jacobson |
| 7,110,163 | B2 | 9/2006 | Webber et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,144,942 | B2 | 12/2006 | Zang et al. |
| 7,148,128 | B2 | 12/2006 | Jacobson |
| 7,167,155 | B1 | 1/2007 | Albert et al. |
| 7,170,670 | B2 | 1/2007 | Webber |
| 7,173,752 | B2 | 2/2007 | Doshi et al. |
| 7,176,880 | B2 | 2/2007 | Amundson et al. |
| 7,177,066 | B2 | 2/2007 | Chung et al. |
| 7,190,008 | B2 | 3/2007 | Amundson et al. |
| 7,193,625 | B2 | 3/2007 | Danner et al. |
| 7,202,847 | B2 | 4/2007 | Gates |
| 7,206,119 | B2 | 4/2007 | Honeyman et al. |
| 7,223,672 | B2 | 5/2007 | Kazlas et al. |
| 7,230,751 | B2 | 6/2007 | Whitesides et al. |
| 7,236,291 | B2 | 6/2007 | Kaga et al. |
| 7,256,766 | B2 | 8/2007 | Albert et al. |
| 7,259,744 | B2 | 8/2007 | Arango et al. |
| 7,301,693 | B2 | 11/2007 | Chaug et al. |
| 7,304,780 | B2 | 12/2007 | Liu et al. |
| 7,312,784 | B2 | 12/2007 | Baucom et al. |
| 7,321,459 | B2 | 1/2008 | Masuda et al. |
| 7,327,346 | B2 | 2/2008 | Chung et al. |
| 7,327,511 | B2 | 2/2008 | Whitesides et al. |
| 7,339,715 | B2 | 3/2008 | Webber et al. |
| 7,347,957 | B2 | 3/2008 | Wu et al. |
| 7,352,353 | B2 | 4/2008 | Albert et al. |
| 7,365,733 | B2 | 4/2008 | Duthaler et al. |
| 7,388,572 | B2 | 6/2008 | Duthaler et al. |
| 7,401,758 | B2 | 7/2008 | Liang et al. |
| 7,408,699 | B2 | 8/2008 | Wang et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,492,339 | B2 | 2/2009 | Amundson |
| 7,492,497 | B2 | 2/2009 | Paolini, Jr. et al. |
| 7,528,822 | B2 | 5/2009 | Amundson et al. |
| 7,535,624 | B2 | 5/2009 | Amundson et al. |
| 7,551,346 | B2 | 6/2009 | Fazel et al. |
| 7,554,712 | B2 | 6/2009 | Patry et al. |
| 7,560,004 | B2 | 7/2009 | Pereira et al. |
| 7,583,251 | B2 | 9/2009 | Arango et al. |
| 7,583,427 | B2 | 9/2009 | Danner et al. |
| 7,598,173 | B2 | 10/2009 | Ritenour et al. |
| 7,602,374 | B2 | 10/2009 | Zehner et al. |
| 7,612,760 | B2 | 11/2009 | Kawai |
| 7,636,191 | B2 | 12/2009 | Duthaler et al. |
| 7,649,674 | B2 | 1/2010 | Danner et al. |
| 7,667,886 | B2 | 2/2010 | Danner et al. |
| 7,672,040 | B2 | 3/2010 | Sohn et al. |
| 7,679,599 | B2 | 3/2010 | Kawai |
| 7,679,813 | B2 | 3/2010 | Liang et al. |
| 7,679,814 | B2 | 3/2010 | Paolini, Jr. et al. |
| 7,683,606 | B2 | 3/2010 | Kang et al. |
| 7,688,497 | B2 | 3/2010 | Danner et al. |
| 7,715,088 | B2 | 5/2010 | Liang et al. |
| 7,830,592 | B1 | 11/2010 | Sprague et al. |
| 7,839,564 | B2 | 11/2010 | Whitesides et al. |
| 7,859,637 | B2 | 12/2010 | Amundson et al. |
| 7,859,742 | B1 | 12/2010 | Chiu et al. |
| 7,880,958 | B2 | 2/2011 | Zang et al. |
| 7,893,435 | B2 | 2/2011 | Kazlas et al. |
| 7,905,977 | B2 | 3/2011 | Qi et al. |
| 7,910,175 | B2 | 3/2011 | Webber |
| 7,952,557 | B2 | 5/2011 | Amundson |
| 7,952,790 | B2 | 5/2011 | Honeyman et al. |
| 7,982,479 | B2 | 7/2011 | Wang et al. |
| 7,986,450 | B2 | 7/2011 | Cao et al. |
| 7,999,787 | B2 | 8/2011 | Amundson et al. |
| 8,009,344 | B2 | 8/2011 | Danner et al. |
| 8,009,348 | B2 | 8/2011 | Zehner et al. |
| 8,040,594 | B2 | 10/2011 | Paolini, Jr. et al. |
| 8,049,947 | B2 | 11/2011 | Danner et al. |
| 8,054,526 | B2 | 11/2011 | Bouchard |

(56) References Cited

U.S. PATENT DOCUMENTS

| | | | |
|---|---|---|---|
| 8,072,675 B2 | 12/2011 | Lin et al. | |
| 8,098,418 B2 | 1/2012 | Paolini, Jr. et al. | |
| 8,120,836 B2 | 2/2012 | Lin et al. | |
| 8,125,501 B2 | 2/2012 | Amundson et al. | |
| 8,139,050 B2 | 3/2012 | Jacobson et al. | |
| 8,159,636 B2 | 4/2012 | Sun et al. | |
| 8,174,490 B2 | 5/2012 | Whitesides et al. | |
| 8,237,892 B1 | 8/2012 | Sprague et al. | |
| 8,243,013 B1 | 8/2012 | Sprague et al. | |
| 8,274,472 B1 | 9/2012 | Wang et al. | |
| 8,289,250 B2 | 10/2012 | Zehner et al. | |
| 8,300,006 B2 | 10/2012 | Zhou et al. | |
| 8,314,784 B2 | 11/2012 | Ohkami et al. | |
| 8,319,759 B2 | 11/2012 | Jacobson et al. | |
| 8,362,488 B2 | 1/2013 | Chaug et al. | |
| 8,363,299 B2 | 1/2013 | Paolini, Jr. et al. | |
| 8,373,649 B2 | 2/2013 | Low et al. | |
| 8,384,658 B2 | 2/2013 | Albert et al. | |
| 8,395,836 B2 | 3/2013 | Lin | |
| 8,437,069 B2 | 5/2013 | Lin | |
| 8,441,414 B2 | 5/2013 | Lin | |
| 8,456,414 B2 | 6/2013 | Lin et al. | |
| 8,456,589 B1 | 6/2013 | Sprague et al. | |
| 8,462,102 B2 | 6/2013 | Wong et al. | |
| 8,514,168 B2 | 8/2013 | Chung et al. | |
| 8,537,105 B2 | 9/2013 | Chiu et al. | |
| 8,547,628 B2 | 10/2013 | Wu et al. | |
| 8,558,783 B2 | 10/2013 | Wilcox et al. | |
| 8,558,786 B2 | 10/2013 | Lin | |
| 8,558,855 B2 | 10/2013 | Sprague et al. | |
| 8,564,531 B2 | 10/2013 | Ozawa | |
| 8,576,162 B2 | 11/2013 | Kang | |
| 8,576,164 B2 | 11/2013 | Sprague et al. | |
| 8,576,259 B2 | 11/2013 | Lin et al. | |
| 8,576,470 B2 | 11/2013 | Paolini, Jr. et al. | |
| 8,576,476 B2 | 11/2013 | Telfer et al. | |
| 8,605,032 B2 | 12/2013 | Liu et al. | |
| 8,610,988 B2 | 12/2013 | Zehner et al. | |
| 8,665,206 B2 | 3/2014 | Lin et al. | |
| 8,681,191 B2 | 3/2014 | Yang et al. | |
| 8,714,780 B2 | 5/2014 | Ho et al. | |
| 8,728,266 B2 | 5/2014 | Danner et al. | |
| 8,743,077 B1 | 6/2014 | Sprague | |
| 8,754,859 B2 | 6/2014 | Gates et al. | |
| 8,797,258 B2 | 8/2014 | Sprague | |
| 8,797,633 B1 | 8/2014 | Sprague et al. | |
| 8,797,634 B2 | 8/2014 | Paolini, Jr. et al. | |
| 8,797,636 B2 | 8/2014 | Yang et al. | |
| 8,810,525 B2 | 8/2014 | Sprague | |
| 8,873,129 B2 | 10/2014 | Paolini, Jr. et al. | |
| 8,902,153 B2 | 12/2014 | Bouchard et al. | |
| 8,928,562 B2 | 1/2015 | Gates et al. | |
| 8,928,641 B2 | 1/2015 | Chiu et al. | |
| 8,976,444 B2 | 3/2015 | Zhang et al. | |
| 9,013,394 B2 | 4/2015 | Lin | |
| 9,019,197 B2 | 4/2015 | Lin | |
| 9,019,198 B2 | 4/2015 | Lin et al. | |
| 9,019,318 B2 | 4/2015 | Sprague et al. | |
| 9,025,234 B2 | 5/2015 | Lin | |
| 9,025,238 B2 | 5/2015 | Chan et al. | |
| 9,030,374 B2 | 5/2015 | Sprague et al. | |
| 9,082,352 B2 | 7/2015 | Cheng et al. | |
| 9,140,952 B2 | 9/2015 | Sprague et al. | |
| 9,147,364 B2 | 9/2015 | Wu et al. | |
| 9,152,004 B2 | 10/2015 | Paolini, Jr. et al. | |
| 9,199,441 B2 | 12/2015 | Danner | |
| 9,201,279 B2 | 12/2015 | Wu et al. | |
| 9,218,773 B2 | 12/2015 | Sun et al. | |
| 9,223,164 B2 | 12/2015 | Lai et al. | |
| 9,224,338 B2 | 12/2015 | Chan et al. | |
| 9,224,342 B2 | 12/2015 | Sprague et al. | |
| 9,224,344 B2 | 12/2015 | Chung et al. | |
| 9,230,492 B2 | 1/2016 | Harrington et al. | |
| 9,262,973 B2 | 2/2016 | Wu et al. | |
| 9,279,906 B2 | 3/2016 | Kang | |
| 9,285,648 B2 | 3/2016 | Liu et al. | |
| 9,299,294 B2 | 3/2016 | Lin et al. | |
| 9,310,661 B2 | 4/2016 | Wu et al. | |
| 9,373,289 B2 | 6/2016 | Sprague et al. | |
| 9,390,066 B2 | 7/2016 | Smith et al. | |
| 9,390,661 B2 | 7/2016 | Chiu et al. | |
| 9,454,057 B2 | 9/2016 | Wu et al. | |
| 9,460,666 B2 | 10/2016 | Sprague et al. | |
| 9,495,918 B2 | 11/2016 | Harrington et al. | |
| 9,501,981 B2 | 11/2016 | Lin et al. | |
| 9,513,743 B2 | 12/2016 | Sjodin et al. | |
| 9,514,667 B2 | 12/2016 | Lin | |
| 9,529,240 B2 | 12/2016 | Paolini, Jr. et al. | |
| 9,582,041 B2 | 2/2017 | Cheng et al. | |
| 9,620,048 B2 | 4/2017 | Sim et al. | |
| 9,620,066 B2 | 4/2017 | Bishop | |
| 9,632,373 B2 | 4/2017 | Huang et al. | |
| 9,666,142 B2 | 5/2017 | Hung | |
| 9,671,635 B2 | 6/2017 | Paolini, Jr. | |
| 9,672,766 B2 | 6/2017 | Sjodin | |
| 9,691,333 B2 | 6/2017 | Cheng et al. | |
| 9,721,495 B2 | 8/2017 | Harrington et al. | |
| 9,792,861 B2 | 10/2017 | Chang et al. | |
| 9,792,862 B2 | 10/2017 | Hung et al. | |
| 10,037,735 B2 | 7/2018 | Amundson | |
| 10,048,563 B2 | 8/2018 | Paolini, Jr. et al. | |
| 10,190,743 B2 | 1/2019 | Hertel et al. | |
| 10,229,641 B2 | 3/2019 | Yang et al. | |
| 10,319,313 B2 | 6/2019 | Harris et al. | |
| 10,339,876 B2 | 7/2019 | Lin et al. | |
| 10,372,008 B2 | 8/2019 | Telfer et al. | |
| 10,446,585 B2 | 10/2019 | Harris et al. | |
| 10,466,564 B2 | 11/2019 | Kayal et al. | |
| 10,475,396 B2 | 11/2019 | Sim et al. | |
| 10,613,407 B2 | 4/2020 | Lin et al. | |
| 10,672,350 B2 | 6/2020 | Amundson et al. | |
| 2002/0060321 A1 | 5/2002 | Kazlas et al. | |
| 2003/0102858 A1 | 6/2003 | Jacobson et al. | |
| 2004/0085619 A1 | 5/2004 | Wu et al. | |
| 2004/0105036 A1 | 6/2004 | Danner et al. | |
| 2004/0246562 A1 | 12/2004 | Chung et al. | |
| 2005/0001812 A1* | 1/2005 | Amundson | G09G 3/38 345/107 |
| 2005/0122306 A1 | 6/2005 | Wilcox et al. | |
| 2005/0122563 A1 | 6/2005 | Honeyman et al. | |
| 2005/0253777 A1 | 11/2005 | Zehner et al. | |
| 2006/0255322 A1 | 11/2006 | Wu et al. | |
| 2007/0103427 A1 | 5/2007 | Zhou et al. | |
| 2007/0176912 A1 | 8/2007 | Beames et al. | |
| 2008/0024429 A1 | 1/2008 | Zehner | |
| 2008/0024482 A1 | 1/2008 | Gates et al. | |
| 2008/0043318 A1 | 2/2008 | Whitesides et al. | |
| 2008/0136774 A1 | 6/2008 | Harris et al. | |
| 2008/0303780 A1 | 12/2008 | Sprague et al. | |
| 2009/0122389 A1 | 5/2009 | Whitesides et al. | |
| 2009/0225398 A1 | 9/2009 | Duthaler et al. | |
| 2009/0322721 A1 | 12/2009 | Zehner et al. | |
| 2010/0156780 A1 | 6/2010 | Jacobson et al. | |
| 2010/0177396 A1 | 7/2010 | Lin | |
| 2010/0194733 A1 | 8/2010 | Lin et al. | |
| 2010/0194789 A1 | 8/2010 | Lin et al. | |
| 2010/0265561 A1 | 10/2010 | Gates et al. | |
| 2011/0012889 A1 | 1/2011 | Miyamoto | |
| 2011/0063314 A1 | 3/2011 | Chiu et al. | |
| 2011/0175875 A1 | 7/2011 | Lin et al. | |
| 2011/0221740 A1 | 9/2011 | Yang et al. | |
| 2011/0292319 A1 | 12/2011 | Cole | |
| 2012/0001957 A1 | 1/2012 | Liu et al. | |
| 2012/0098740 A1 | 4/2012 | Chiu et al. | |
| 2013/0063333 A1 | 3/2013 | Arango et al. | |
| 2013/0249782 A1 | 9/2013 | Wu et al. | |
| 2014/0078024 A1 | 3/2014 | Paolini, Jr. et al. | |
| 2014/0192000 A1 | 7/2014 | Hung et al. | |
| 2014/0204012 A1 | 7/2014 | Wu et al. | |
| 2014/0210701 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2015/0262255 A1 | 9/2015 | Khajehnouri et al. | |

(56) References Cited

U.S. PATENT DOCUMENTS

| | | | | |
|---|---|---|---|---|
| 2016/0077375 | A1 | 3/2016 | Lin | |
| 2016/0180777 | A1 | 6/2016 | Lin et al. | |
| 2019/0266956 | A1 | 8/2019 | Sim et al. | |
| 2020/0209703 | A1 * | 7/2020 | Lin | G09G 3/344 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Wood, D., "An Electrochromic Renaissance?" Information Display, 18(3), 24 (Mar. 2002).

Bach, Udo. et al., "Nanomaterials-Based Electrochromics for Paper-Quality Displays", Adv. Mater, vol. 14, No. 11, pp. 345-348, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Taiwan Intellectual Property Office, "Notification For the Opinion of Examination", Taiwan Patent Appl. No. 111131149, dated Oct. 17, 2023, 14 pages.

* cited by examiner

200

100

METHODS FOR DRIVING ELECTRO-OPTIC DISPLAYS

CROSS-REFERENCE TO RELATED APPLICATIONS

This application claims priority to U.S. Provisional Application No. 63/234,295 filed Aug. 18, 2021, and to U.S. Provisional Application No. 63/336,331 filed Apr. 29, 2022. The entire disclosures of the aforementioned provisional applications are incorporated by reference herein.

FIELD OF THE INVENTION

The subject matter disclosed herein relates to means and methods to drive electro-optic displays. More particularly, the subject matter is related to driving methods and/or schemes for reducing optical kickback and build-up of remnant voltages caused by residual charges.

BACKGROUND OF THE INVENTION

Electrophoretic displays or EPDs are commonly driven by so-called DC-balanced waveforms. DC-balanced waveforms have been proven to improve long-term usage of EPDs by reducing severe hardware degradations and eliminating other reliability issues. However, the DC-balance waveform constraint limits the set of possible waveforms that are available to drive the EPD display, making it difficult or sometimes impossible to implement advantageous features via a waveform mode. For example, when implementing a "flash-less" white-on-black display mode, excessive white edge accumulation may become visible when graytones that have transitioned to black are next to a non-flashing black background. To clear such edges, a DC-imbalanced drive scheme may have worked well, but such drive scheme requires breaking the DC-balance constraint. Waveforms that are not DC-balanced may result in polarization kickback (e.g., a change in the optical state of an electro-optic medium in a short period after the medium ceases to be driven; for example, a pixel driven to black play revert to a dark gray a short period after the waveform concludes) and cause damage to the electrodes.

Furthermore, electro-optic displays driven by DC-imbalanced waveforms may produce a remnant voltage, this remnant voltage being ascertainable by measuring the open-circuit electrochemical potential of a display pixel. It has been found that remnant voltage is a more general phenomenon in electrophoretic and other impulse-driven electro-optic displays, both in cause(s) and effect(s). It has also been found that DC imbalances may cause long-term lifetime degradation of some electrophoretic displays.

SUMMARY OF THE INVENTION

There exists a need to design driving methods or schemes that address the deficiencies described above. In particular, there exists a need for driving methods or schemes that can eliminate or minimize the hardware degradations caused by optical kickback and remnant voltage.

In one aspect, the invention includes a method for driving an electro-optic display having a plurality of display pixels where each of the display pixels is associated with a display transistor. The method includes the following steps in order: A first voltage is applied to a first display transistor associated with a first display pixel of the plurality of display pixels. The first voltage is applied during at least one frame of a driving waveform. A second voltage is applied to the first display transistor associated with the first display pixel. The second voltage has a non-zero amplitude less than the first voltage and is applied during the last frame of the driving waveform. The amplitude of the second voltage is based on a voltage offset value and a sum of remnant voltages each frame of the driving waveform contributes to the first display pixel when the first voltage is applied to the first display transistor associated with the first display pixel.

In some embodiments, the duration of each frame of the driving waveform is substantially the same. In some embodiments, the amplitude of the second voltage is further based on an amount of lightness of the first display pixel resulting from the driving waveform. In some embodiments, the voltage offset value is based on a voltage contributed to the first display pixel due to a change in a gate voltage of the first display transistor and a parasitic capacitance of the first display transistor.

In some embodiments, the method also includes applying a third voltage to the first display transistor associated with the first display pixel, wherein the third voltage is substantially 0V.

In some embodiments, an amount of remnant voltage each frame of the driving waveform contributes to the first display pixel when the first voltage is applied to the first display transistor associated with the first display pixel is determined based on the amplitude of the first voltage and a remnant voltage coefficient corresponding to an amount of remnant voltage a frame of the driving waveform contributes to the display pixel.

In some embodiments, the method also includes determining the remnant voltage coefficients using an operational transconductance amplifier circuit model.

In another aspect, the invention includes a method for driving a black-and-white electro-optic display to an optical rail state. The electro-optic display includes an electrophoretic display medium electrically coupled between a plurality of display pixel electrodes and a common electrode. Each of the plurality of display pixel electrodes is associated with a display pixel, and the electrophoretic display medium includes a plurality of electrically charged black pigment particles and electrically charged white pigment particles. The method includes the following steps in order: A first display transistor associated with a first display pixel of the plurality of display pixels is connected to a first voltage driver circuit configured to provide a first voltage sufficient to drive the display pixel to an optical rail state. The first voltage is provided during one or more frames of a driving waveform. The first display transistor associated with the first display pixel of the plurality of display pixels is connected to a second voltage driver circuit configured to provide second voltage having a non-zero amplitude less than the first voltage for reducing an amount of remnant voltage the driving waveform contributes to the first display pixel, wherein the second voltage is provided after the one or more frames of the driving waveform. The first display pixel is placed in a floating state.

In some embodiments, the optical rail state comprises one of a substantially black state or a substantially white state. In some embodiments, the electrophoretic display medium includes only the plurality of electrically charged black pigment particles and electrically charged white pigment particles.

In some embodiments, the second voltage is provided for a period of time longer in duration than each frame of the driving waveform. In some embodiments, the second voltage is provided for a period of time shorter in duration than each frame of the driving waveform.

In some embodiments, connecting the first display transistor associated with the first display pixel of the plurality of display pixels to a first voltage driver circuit includes setting a first switching device in electrical communication with the first voltage driver circuit and a display pixel electrode associated with the first display pixel to a closed state.

In some embodiments, connecting the first display transistor associated with the first display pixel of the plurality of display pixels to the second voltage driver circuit includes setting the first switching device to an open state, and setting a second switching device in electrical communication with the second voltage driver circuit and a display pixel electrode associated with the first display pixel to a closed state.

In some embodiments, placing the first display pixel in a floating state comprises setting the second switching device to an open state. In some embodiments, placing the first display pixel in a floating state includes disconnecting an electrical connection between the common electrode and a ground voltage.

In some embodiments, the first voltage and the second voltage have the same polarity. In some embodiments, the amplitude of the second voltage and a duration of time the second voltage is provided are based on an amount of lightness of the optical rail state resulting from the driving waveform.

DETAILED DESCRIPTION

Figure 2:
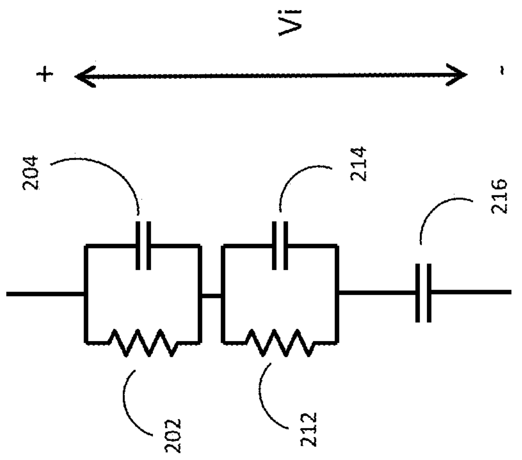
FIG. 2 shows a circuit model of the electro-optic imaging layer.

The subject matter disclosed herein relates to improving electro-optic display durability. Specifically, it is related to driving methods or schemes designed to minimize remnant voltages or charges, which can cause hardware degradation over time.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display (also referred to as "optical rail states"), and should be understood as normally including extreme optical states which are not strictly black and white, for example, the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", *IDW Japan,* 2001, Paper HCS1-1, and Yamaguchi, Y., et al., "Toner display using insulative particles charged triboelectrically", *IDW Japan,* 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318*; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624;* 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/

0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1;

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957; (f)

Methods for driving displays; see for example U.S. Pat. Nos. 7,012,600 and 7,453,445;

(g) Applications of displays; see for example U.S. Pat. Nos. 7,312,784 and 8,009,348;

(h) Non-electrophoretic displays, as described in U.S. Pat. Nos. 6,241,921; 6,950,220; 7,420,549 and 8,319,759; and U.S. Patent Application Publication No. 2012/0293858;

(i) Microcell structures, wall materials, and methods of forming microcells; see for example U.S. Pat. Nos. 7,072,095 and 9,279,906; and (j) Methods for filling and sealing microcells; see for example U.S. Pat. Nos. 7,144,942 and 7,715,088.

This application is further related to U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1; all of the above-listed applications are incorporated by reference in their entireties.

This application is also related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777; all of the above-listed applications are incorporated by reference in their entireties.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Figure 1:
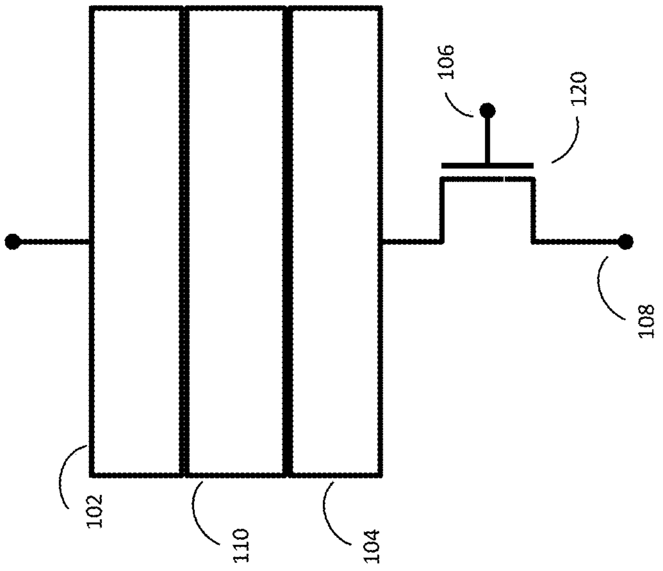
FIG. 1 illustrates a circuit diagram representing an exemplary electrophoretic display.

In yet another embodiment, such as described in U.S. Pat. No. 6,704,133, electrophoretic displays may be constructed with two continuous electrodes and an electrophoretic layer and a photoelectrophoretic layer between the electrodes. Because the photoelectrophoretic material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoelectrophoretic material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly (ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

It has now been found that remnant voltage is a more general phenomenon in electrophoretic and other impulse-driven electro-optic displays, both in cause(s) and effect(s). It has also been found that DC imbalances may cause long-term lifetime degradation of some electrophoretic displays.

There are multiple potential sources of remnant voltage. It is believed (although some embodiments are in no way limited by this belief), that a primary cause of remnant voltage is ionic polarization within the materials of the various layers forming the display.

Such polarization occurs in various ways. In a first (for convenience, denoted "Type I") polarization, an ionic double layer is created across or adjacent a material interface. For example, a positive potential at an indium-tin-oxide ("ITO") electrode may produce a corresponding polarized layer of negative ions in an adjacent laminating adhesive. The decay rate of such a polarization layer is associated with the recombination of separated ions in the lamination adhesive layer. The geometry of such a polarization layer is determined by the shape of the interface, but may be planar in nature.

In a second ("Type II") type of polarization, nodules, crystals or other kinds of material heterogeneity within a single material can result in regions in which ions can move or less quickly than the surrounding material. The differing rate of ionic migration can result in differing degrees of charge polarization within the bulk of the medium, and polarization may thus occur within a single display component. Such a polarization may be substantially localized in nature or dispersed throughout the layer.

In a third ("Type III") type of polarization, polarization may occur at any interface that represents a barrier to charge transport of any particular type of ion. One example of such an interface in a microcavity electrophoretic display is the boundary between the electrophoretic suspension including the suspending medium and particles (the "internal phase") and the surrounding medium including walls, adhesives and binders (the "external phase"). In many electrophoretic displays, the internal phase is a hydrophobic liquid whereas the external phase is a polymer, such as gelatin. Ions that are present in the internal phase may be insoluble and non-diffusible in the external phase and vice versa. On the application of an electric field perpendicular to such an interface, polarization layers of opposite sign will accumulate on either side of the interface. When the applied electric field is removed, the resulting non-equilibrium charge distribution will result in a measurable remnant voltage potential that decays with a relaxation time determined by the mobility of the ions in the two phases on either side of the interface.

Polarization may occur during a drive pulse. Each image update is an event that may affect remnant voltage. A positive waveform voltage can create a remnant voltage across an electro-optic medium that is of the same or opposite polarity (or nearly zero) depending on the specific electro-optic display.

In some instances, the last frame of a driving sequence may contribute the highest level to the polarization of the ink stack. For example, sometimes a last frame can contributes multiple times (e.g., 10×) more remnant charges to the ink stack than a previous frame.

It will be evident from the foregoing discussion that polarization may occur at multiple locations within the electrophoretic or other electro-optic display, each location having its own characteristic spectrum of decay times, principally at interfaces and at material heterogeneities. Depending on the placement of the sources of these voltages (in other words, the polarized charge distribution) relative to the electro-active parts (for example, the electrophoretic suspension), and the degree of electrical coupling between each kind of charge distribution and the motion of the particles through the suspension, or other electro-optic activity, various kinds of polarization will produce more or less deleterious effects. Since an electrophoretic display operates by motion of charged particles, which inherently causes a polarization of the electro-optic layer, in a sense a preferred electrophoretic display is not one in which no remnant voltages are always present in the display, but rather one in which the remnant voltages do not cause objectionable electro-optic behavior. Ideally, the remnant impulse will be minimized and the remnant voltage will decrease below 1 V, and preferably below 0.2 V, within 1 second, and preferably within 50 ms, so that that by introducing a minimal pause between image updates, the electrophoretic display may affect all transitions between optical states without concern for remnant voltage effects. For electrophoretic displays operating at video rates or at voltages below +/−15 V these ideal values should be correspondingly reduced. Similar considerations apply to other types of electro-optic display.

To summarize, remnant voltage as a phenomenon is at least substantially a result of ionic polarization occurring within the display material components, either at interfaces or within the materials themselves. Such polarizations are especially problematic when they persist on a time scale of roughly 50 ms to about an hour or longer. Remnant voltage can present itself as image ghosting or visual artifacts in a variety of ways, with a degree of severity that can vary with the elapsed times between image updates. Remnant voltage can also create a DC imbalance and reduce ultimate display lifetime. The effects of remnant voltage therefore may be deleterious to the quality of the electrophoretic or other electro-optic device and it is desirable to minimize both the remnant voltage itself, and the sensitivity of the optical states of the device to the influence of the remnant voltage.

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Figure 3B:
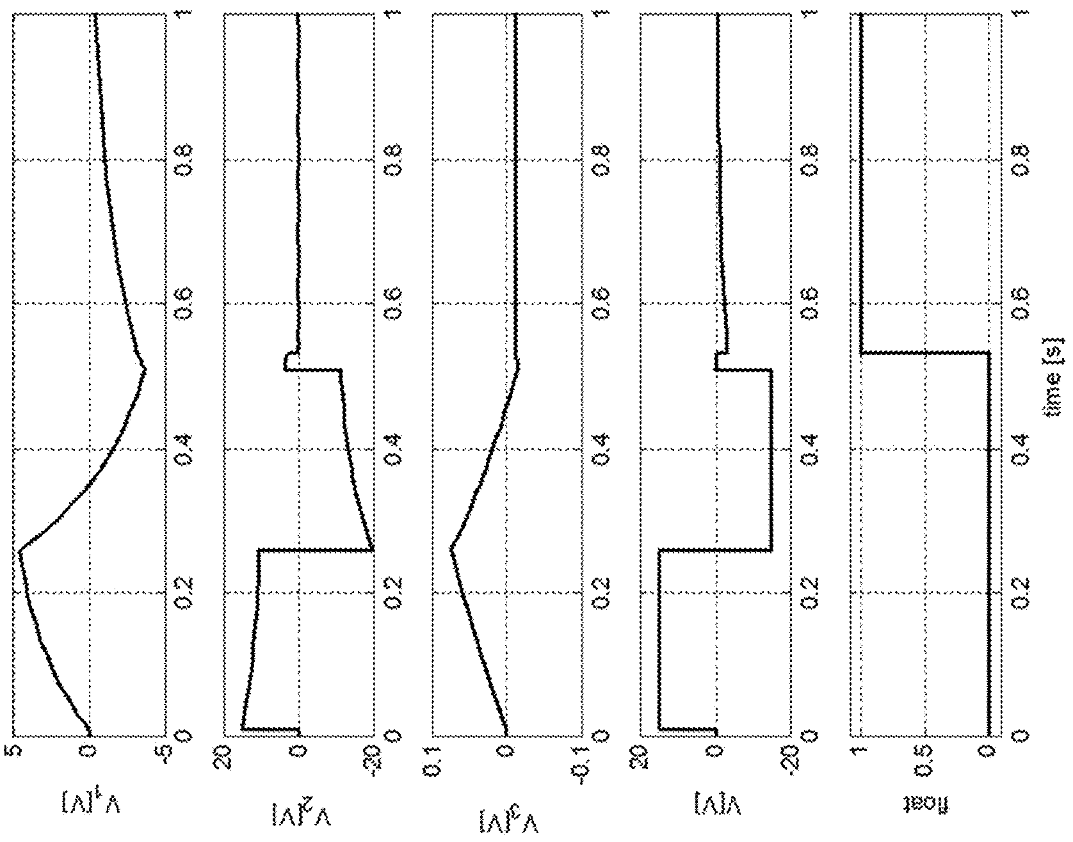
FIG. 3B illustrates corresponding voltages for the model illustrated in FIG. 3B.
Figure 3A:
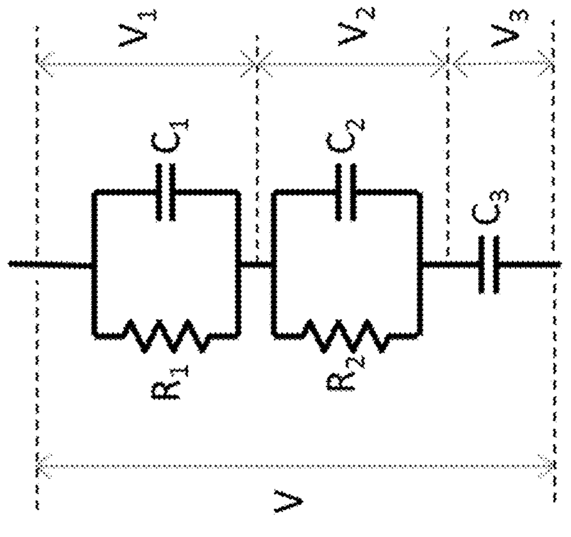
FIG. 3A illustrates a linear ink model of an electrophoretic display.

In another view representing the electro-optic medium, referring now to FIG. 3A and FIG. 3B, $V_1$ represent the voltage across the internal phase of the ink; $V_2$ represents the voltage across the external phase and $V_3$ represents the voltage across the interfacial layer of the adhesive and electrode. The capacitance and resistance values may be determined by fitting the model to actual experimental data. Based on these capacitance and resistance values, FIG. 3B shows the voltage across the internal, external and interfacial layers. As shown, the internal phase of the ink exhibits a reversal of drive voltage during shorting that results in optical kickback.

Figure 4:
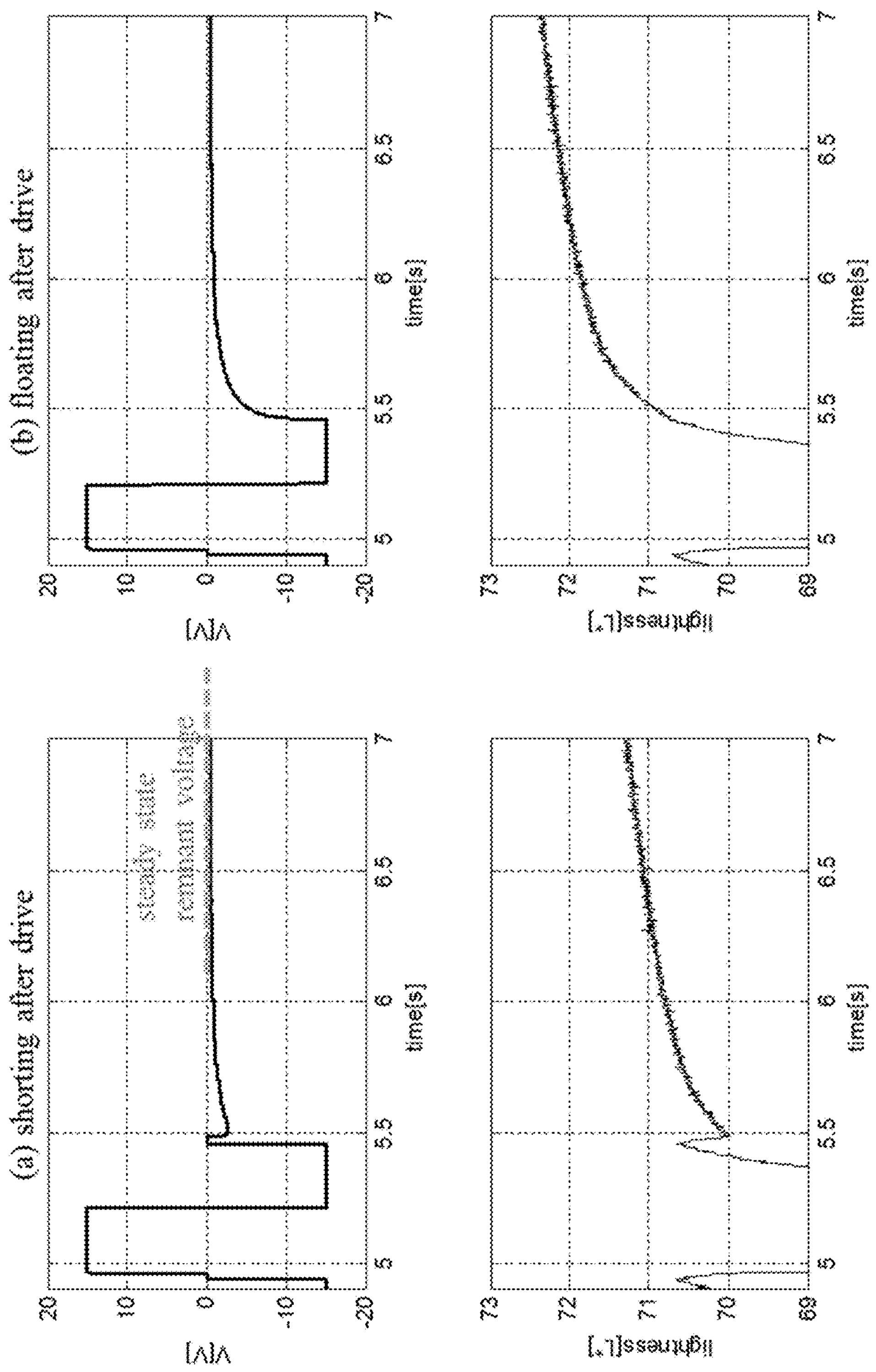
FIG. 4 illustrates voltages across an electro-optic medium resulting from shorting and floating after an active drive.
Figure 5:
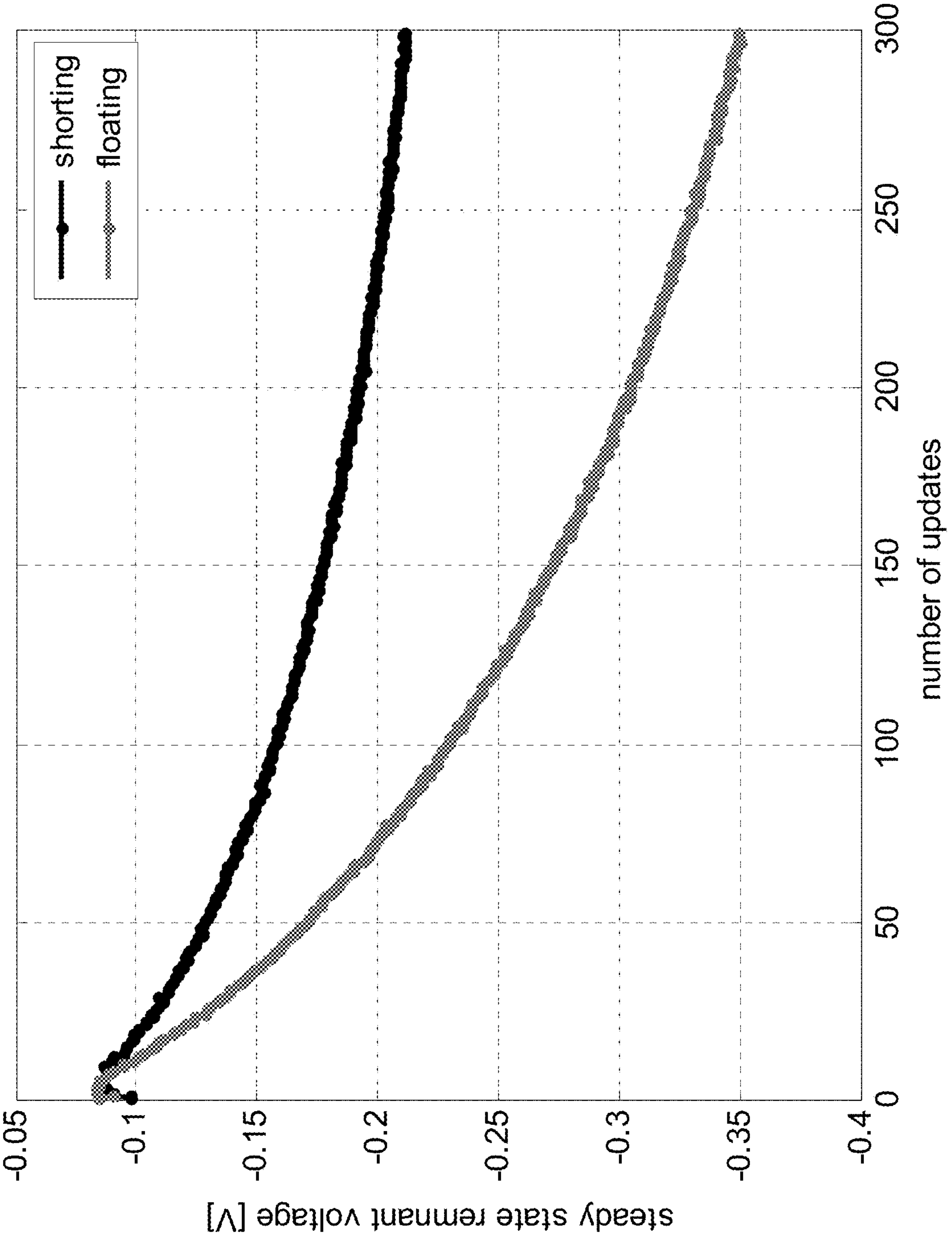
FIG. 5 illustrates a build-up of residual charges of a DC balanced white-to-white transition.

One way to avoid this optical kickback is to float the pixel at the end of the active drive (i.e., power off the gate, and in some instances the source, of the TFT corresponding to the pixel, thereby isolating the pixel from any conductive path). Avoiding optical kickback may be beneficial for the extreme dark/black and white state as these optical rails (e.g., the two extreme optical states of the electro-optic medium; typically black and white) influence the achievable dynamic range of the display and hence, the fundamental optical quality of the display. FIG. 4 illustrates the optical effects and remnant voltage decay with shorting (a) and floating (b) after an active drive with a test glass. Referring now to FIG. 5, while floating after an active drive addresses the optical kickback issue, the build-up of residual charge (as measured by the steady state remnant voltage in FIG. 5) in the electro-optic medium is higher and can be potentially damaging to the display. This is the reason why in typical drive in both the segmented and active matrix display, shorting may be used after an active drive to reduce the build-up of residual charge.

In practice, charges built up within an electrophoretic material due to polarization effect described above may be mitigated to reduce the remnant voltage effect. For example, by reduce the voltage level of the last frame of a driving sequence.

In some embodiments, the change in remnant voltage by an applied driving waveform V(k) with N frames may be predicted as $$\Delta V_{rem}=V_{offset}+\Sigma_{k=1-N}V(k)*b(N-k+1) \quad (1)$$

Where the change in remnant voltage $\Delta V_{rem}$ is the sum of an offset voltage $V_{offset}$ and a summation of the remnant voltages contributed by each frame of the driving waveform, the offset $V_{offset}$ being the voltage added due to the gate voltage change and the TFT parasitic capacitances. In practice, each frame of the driving waveform contributes a certain amount of remnant voltage as dictated by the remnant voltage coefficient b, where in some instances, the remnant voltage coefficient b is the highest for the last frame of the drive. The remnant voltage coefficient b may be determined experimentally or calculated mathematically using models such as an Ota circuit model.

Figure 6:
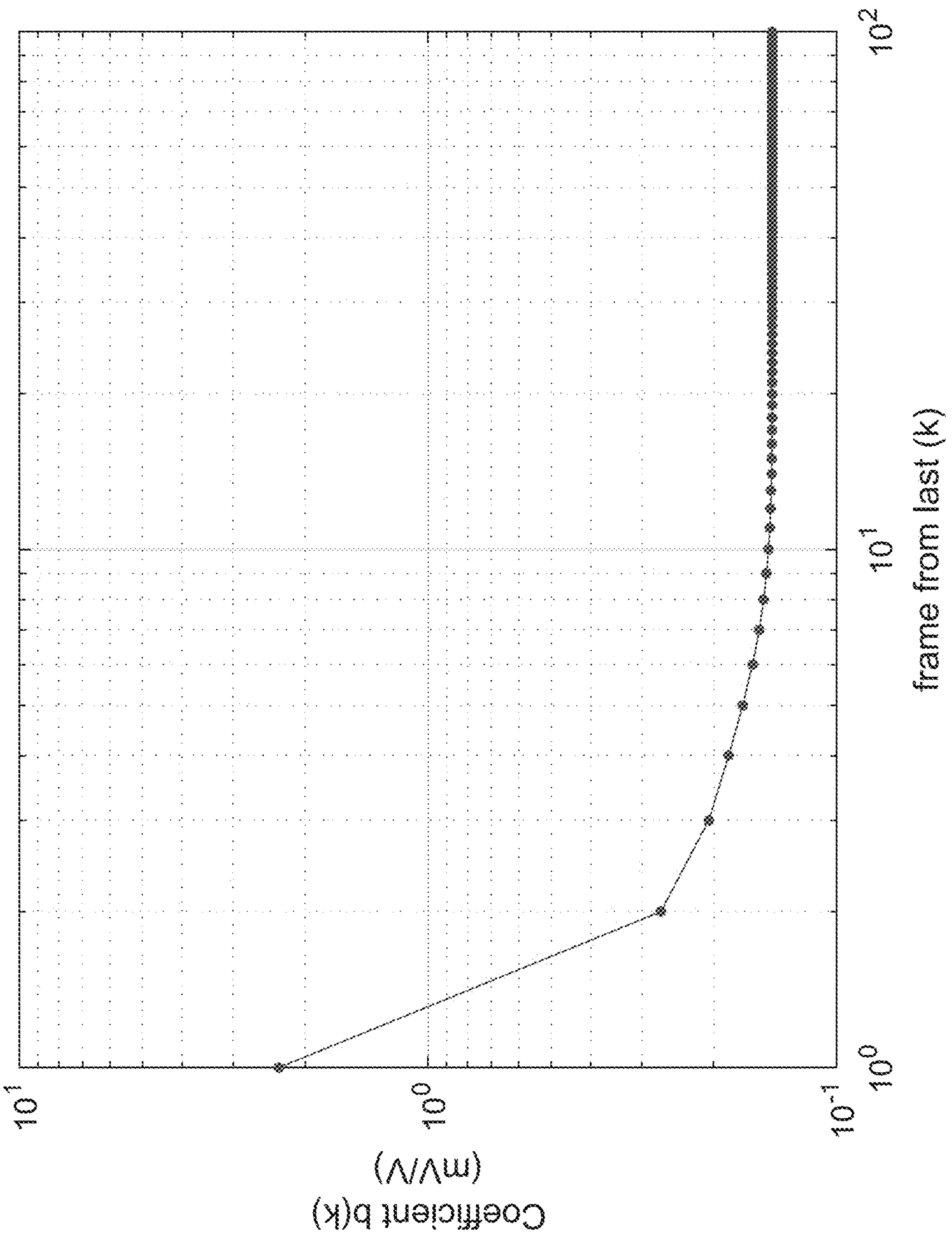
FIG. 6 illustrates an exemplary remnant voltage coefficient diagram corresponding to individual frames of a driving waveform.

Referring now to FIG. 6, illustrated herein is an exemplary remnant voltage coefficient curve determined by fitting a linear remnant voltage model of equation (1) to measured remnant voltage change on an active matrix display (e.g., an electrophoretic display) using a plurality of random waveforms. As FIG. 6 shows, the last frame contributes to the highest level to the polarization of the ink stack, resulting in a 10× higher remnant voltage coefficient (b(1)) than the earlier frames (b(k>1)).

Figure 7:
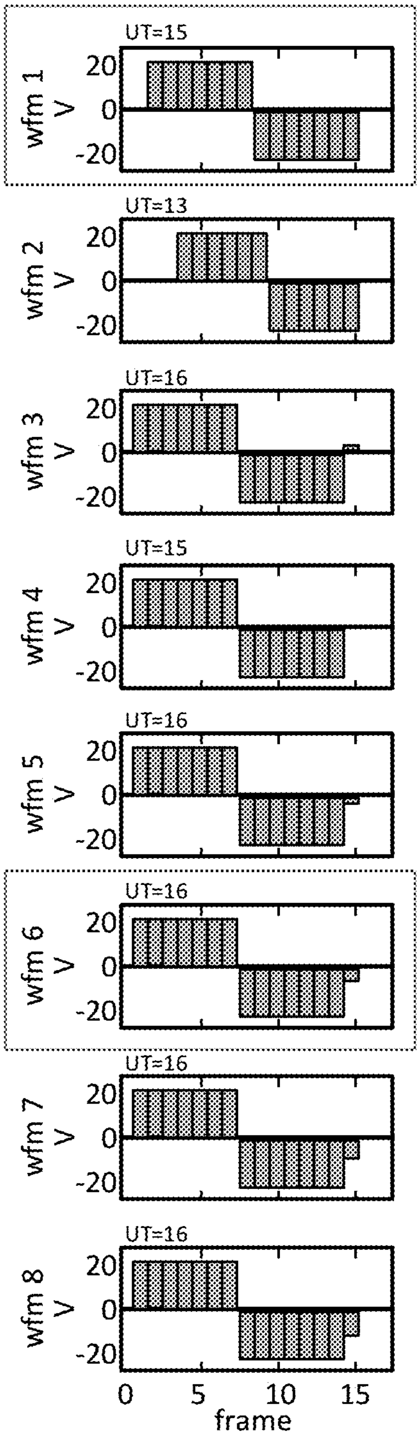
FIG. 7 illustrates eight sample driving waveforms.
Figure 8:
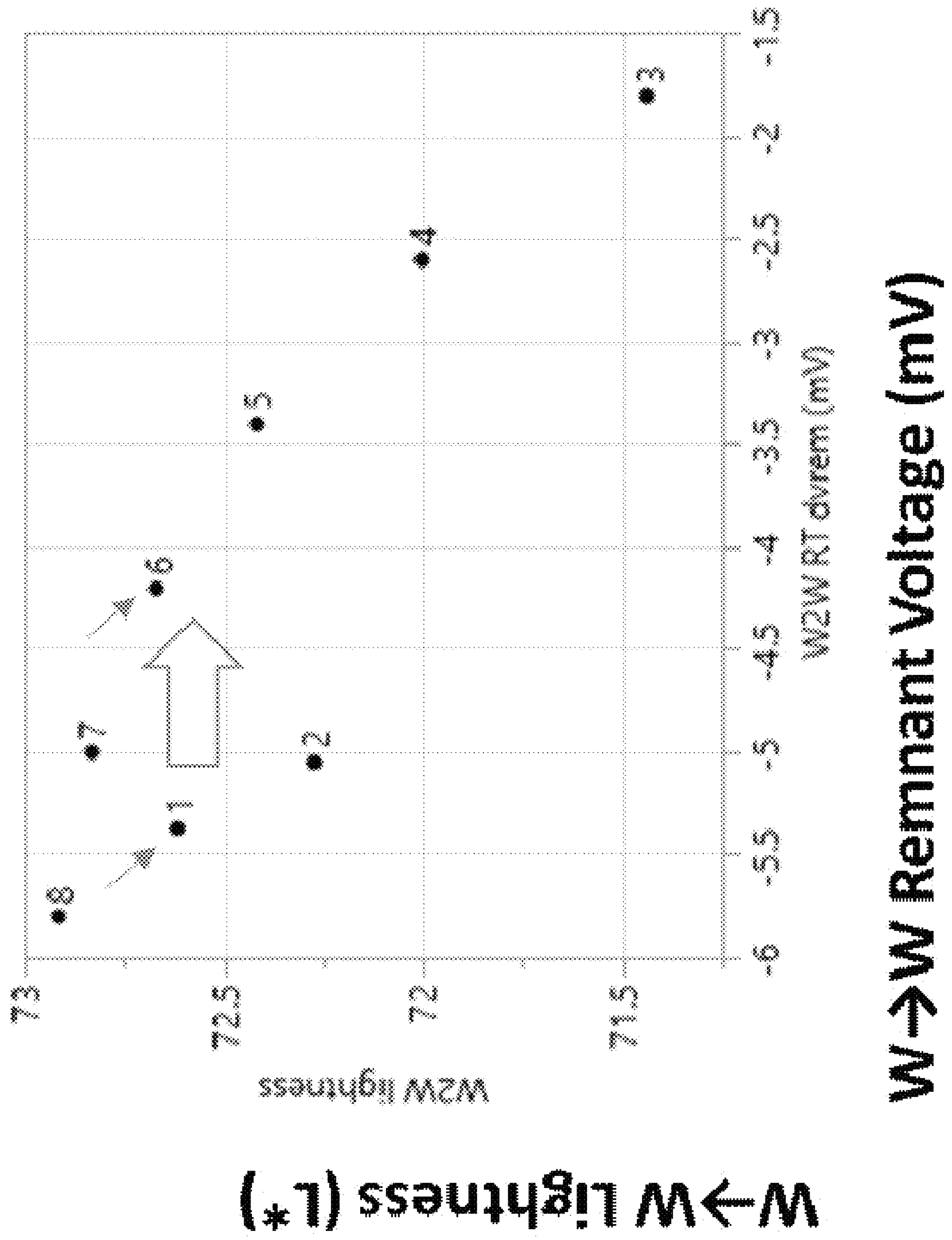
FIG. 8 illustrates remnant voltage values corresponding to the waveforms shown in FIG. 7.

In practice, adjusting the voltage amplitude of the last frame of a drive sequence or driving scheme or driving waveform to a right level can result in a reduced remnant charges or voltages generated. Referring now to FIG. 7, where eight waveforms with different last frame voltage amplitudes are applied to a display. Specifically, waveform 1 shows a last frame having a same voltage as the previous frames, and in contrast, waveform 6 shows a last frame having a lower voltage compared to previous frames. The resulting remnant voltage values are presented in FIG. 8 where waveform 6 (i.e., approximately 4.2 volts in absolute value) resulted in a reduced remnant voltage generated compared to that of waveform 1 (i.e., approximately 5.2 volts in absolute value). In general, to achieve a better optical state and also reduce remnant voltage built-up, and for the purpose of illustrate the working principle presented herein, a white-to-white transition is used here as an example where a negative voltage drives a display pixel to white, the $$\Delta V_{rem,\ new} \geq \Delta V_{rem,\ old} \quad (2)$$

$$L_{new} \geq L_{old} \quad (3)$$

Where the change in remnant voltage due to applying the new waveform $\Delta V_{rem,\ new}$ is larger than or equal to the change in remnant voltage due to applying the old waveform $\Delta V_{rem,\ old}$, but it should be noted that since discussed here is a white-to-white transition where negative voltages are used to drive the display pixels and the resulting remnant voltages are negative in value as well, as such, $\Delta V_{rem,\ new} \geq \Delta V_{rem,\ old}$ means the change in remnant voltage due to the new waveform is less negative than if the old waveform is applied, because less remnant voltage is generated by the new waveform.

Furthermore, if equation (2) is expressed in terms of equation (1), then $$\Sigma_{k=1-N} V(k)*b(N-k+1+\Delta k)+V_{low}*b(1+\Delta k) \geq \Sigma_{k=1-N} V(k)*b(N-k+1) \rightarrow V_{low} \geq V_{low}^{*}=[1/b(1+\Delta k)]*\Sigma_{k=1-N} V(k)*[b(N-k+1)-b(N-k+1+\Delta k)] \quad (4)$$

which means that the low voltage $V_{low}$ at the end of a waveform shifted by Δk frames needs to be smaller in magnitude than or equal to $V_{low}^*$ as defined in Equation (4), while the lightness of the display pixel resulting from the new waveform ($L_{new}$) needs to be whiter than or equal to that of the old waveform ($L_{old}$), in order to achieve enhanced lightness at a smaller remnant voltage cost.

In some embodiments, optical kickback can be avoided by not shorting at the end of an active drive, but instead, pulling the voltage applied to the display pixel to a lower voltage of the same polarity as the drive pulse that does not results in optical kickback, and is small enough to avoid excessive build-up of residual charges. The techniques described herein can be particularly effective for electro-optic displays having an electrophoretic medium incorporating only types of colored pigment particles. In some embodiments, the methods described herein are carried out on black-and-white electro-optic displays having an electrophoretic medium incorporating only charged black pigment particles and charged white pigment particles.

Figures 9A, 9B:
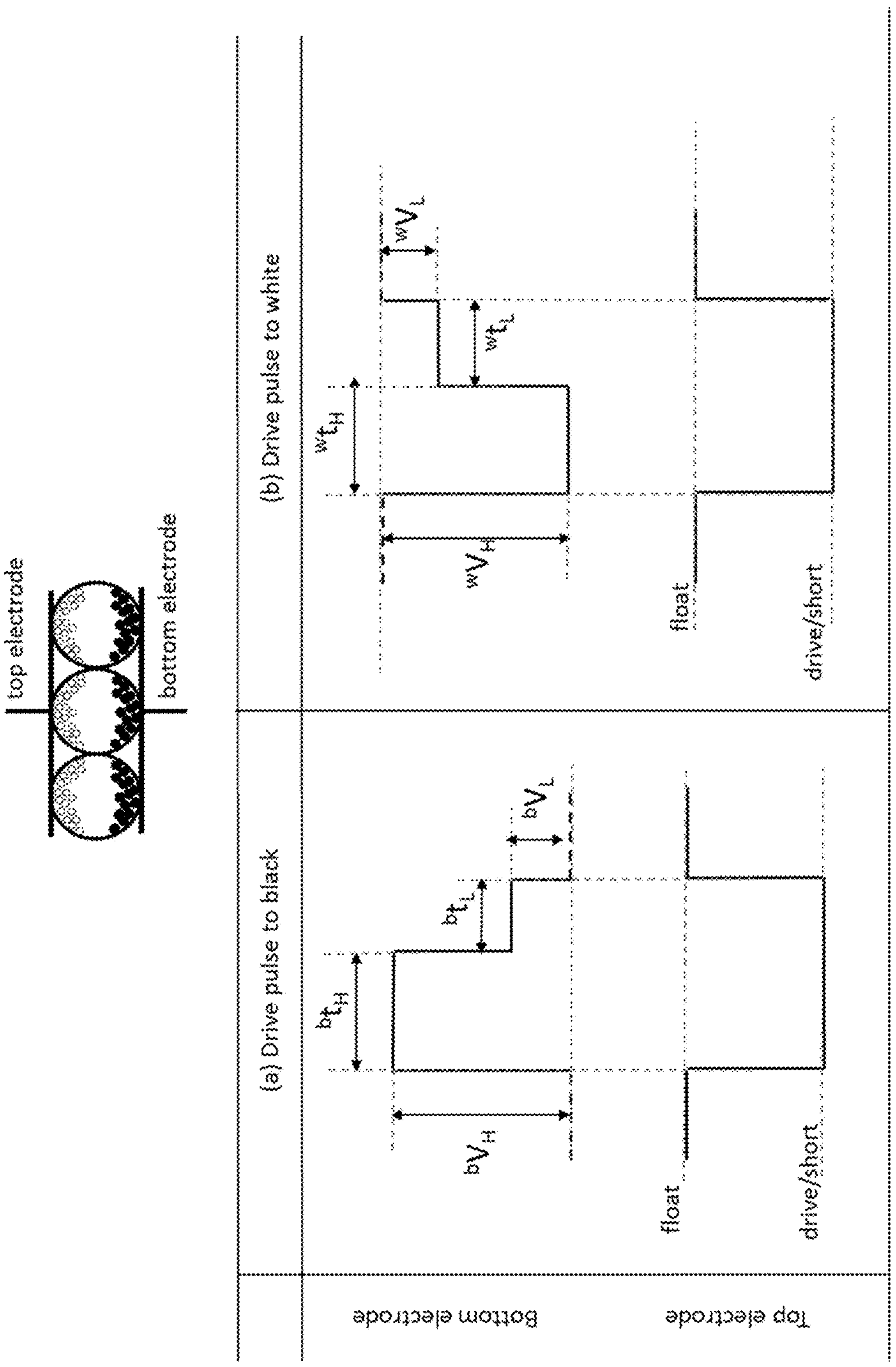
FIG. 9A illustrates an exemplary waveform for driving a display pixel to black.
FIG. 9B illustrates an exemplary waveform for driving a display pixel to white.

FIG. 9A and FIG. 9B illustrate driving waveforms for driving a display pixel to a black state and a white state, respectively. The illustrated shaped waveform pulses are presented herein for illustration purposes only. One of ordinary skill in the art will appreciate that the working principals herein can be applied to waveforms of other shapes and for other optical transitions.

Figure 10A:
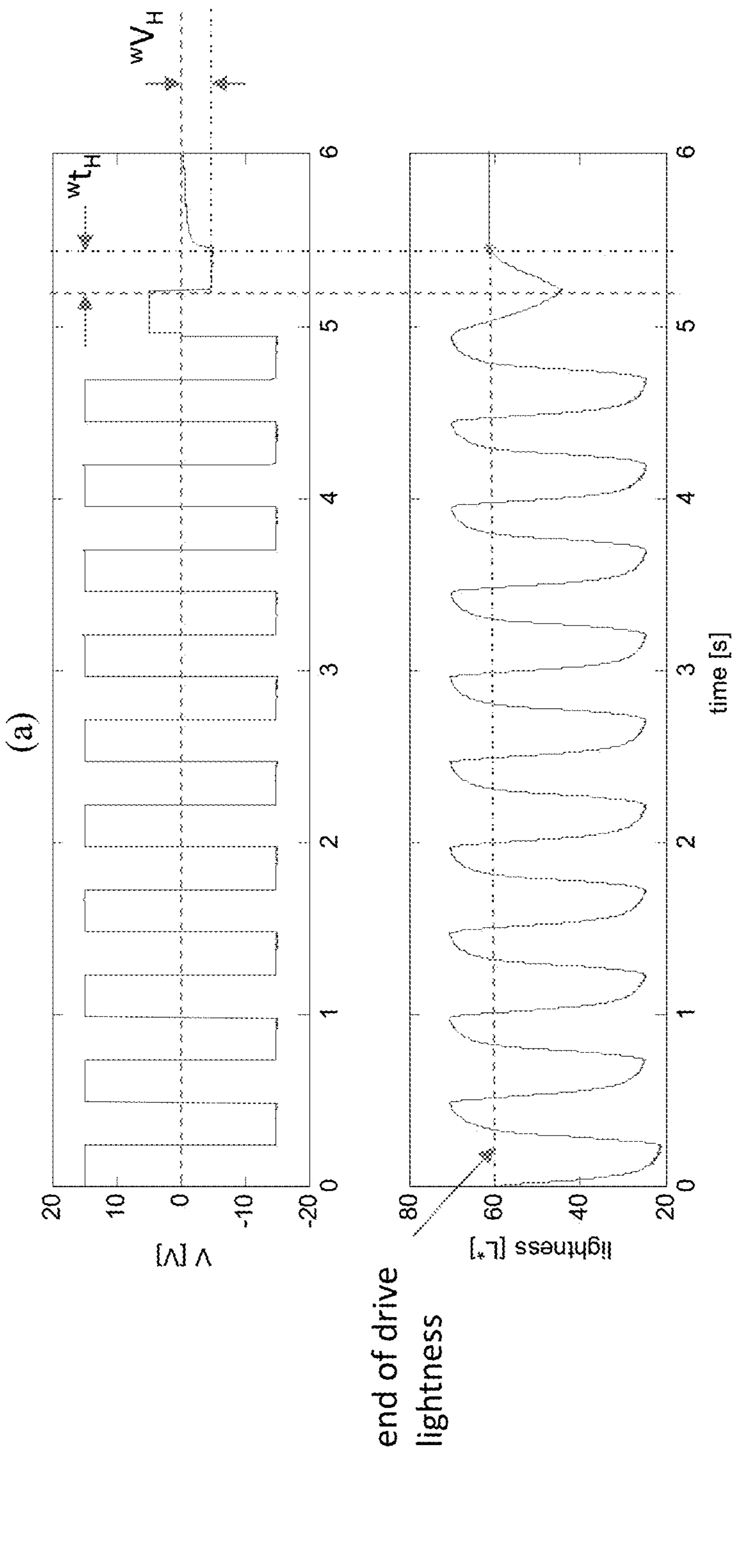
FIG. 10A illustrates a voltage across an electro-optical medium and the resulting lightness definition.
Figure 10B:
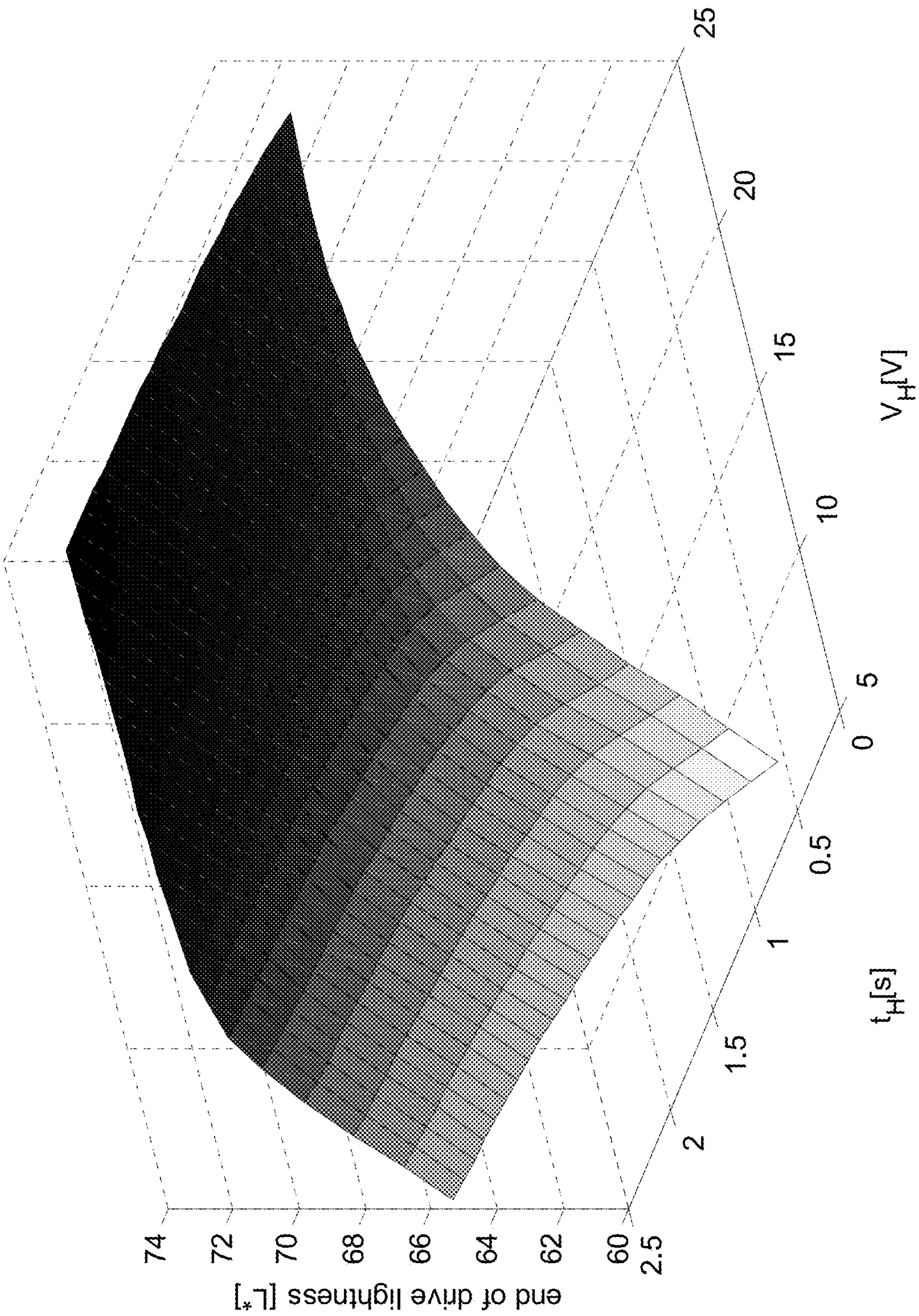
FIG. 10B illustrates the end of drive lightness for different combinations of drive voltage and hold time.

In some embodiments, in constructing a waveform to minimize the optical kickback and the residual charges, one may select a ${}^{w}V_H \leq -10$V, ${}^{w}t_H > 20$ ms (${}^{w}V_H$, ${}^{w}t_H$) pair such that the white optical rail is reached. FIG. 10A illustrates a voltage across an electro-optical medium and the resulting lightness definition, and FIG. 10B illustrates the end of drive lightness L* for different combinations of voltage, ${}^{w}V_H$ and time, ${}^{w}t_H$. A combination of ${}^{w}V_H$ and ${}^{w}t_H$ can be selected to achieve the necessary lightness of the optical white rail. The same methodology using ${}^{b}V_H \geq 10$V and ${}^{b}t_H > 20$ ms can be applied for driving a display pixel to the black optical rail. Secondly, values in the range of $0 > {}^{w}V_L \geq -10$V for ${}^{w}t_L > 20$ ms can be selected such that optical kickback is negligible or to an acceptable level. The minimum ${}^{w}V_L$ may be selected to lower the impact of remnant voltage on the display module. Furthermore, the update time can be further reduced by increasing ${}^{w}V_H$ and reducing ${}^{w}t_H$ as suggested by FIG. 10B to compensate for the extra time needed for ${}^{w}t_L$. One of ordinary skill in the art will appreciate that this method can be adopted for driving display pixels to a black optical state.

Figure 11A:
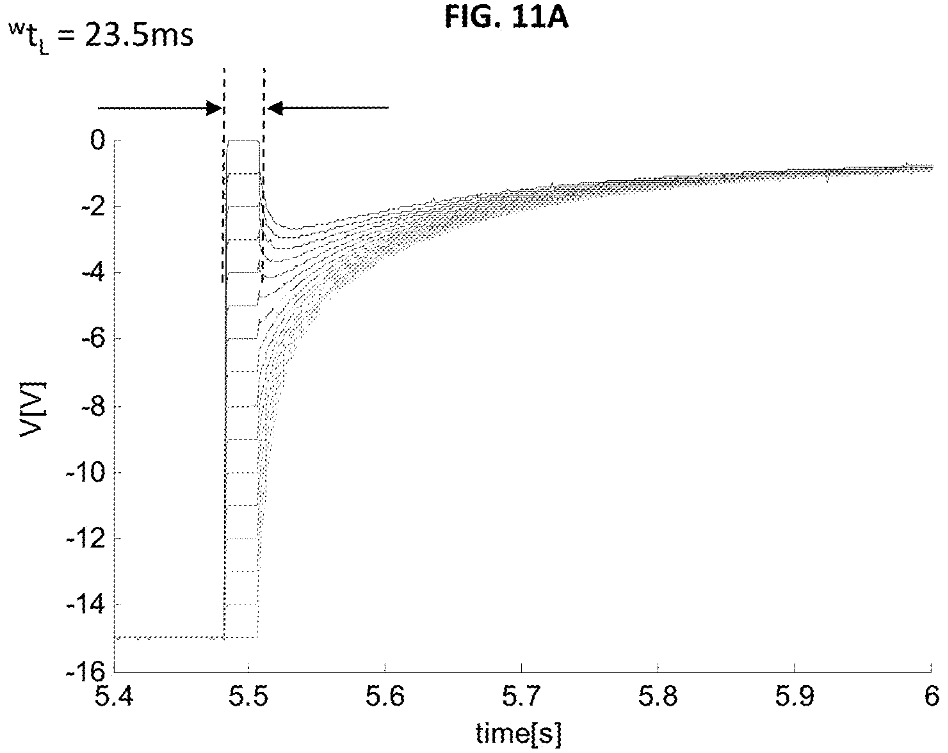
FIG. 11A illustrates another voltages across the electro-optic medium with different ${}^{W}V_L$ voltages.
Figure 11B:
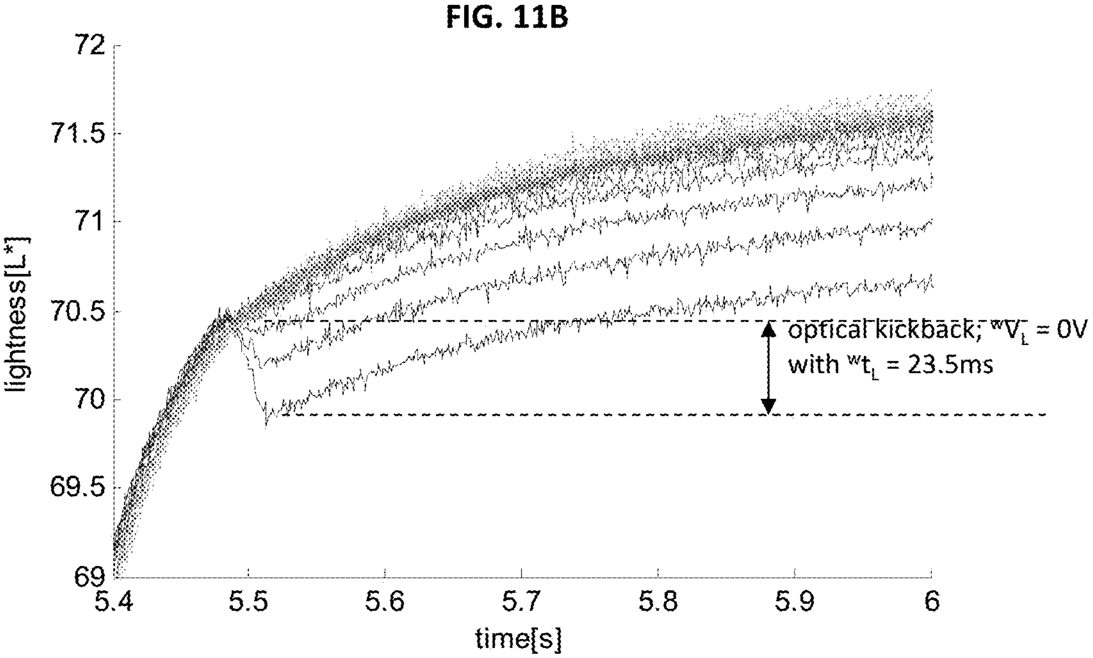
FIG. 11B illustrates the corresponding optical responses to the voltages illustrated in FIG. 11A.
Figure 11C:
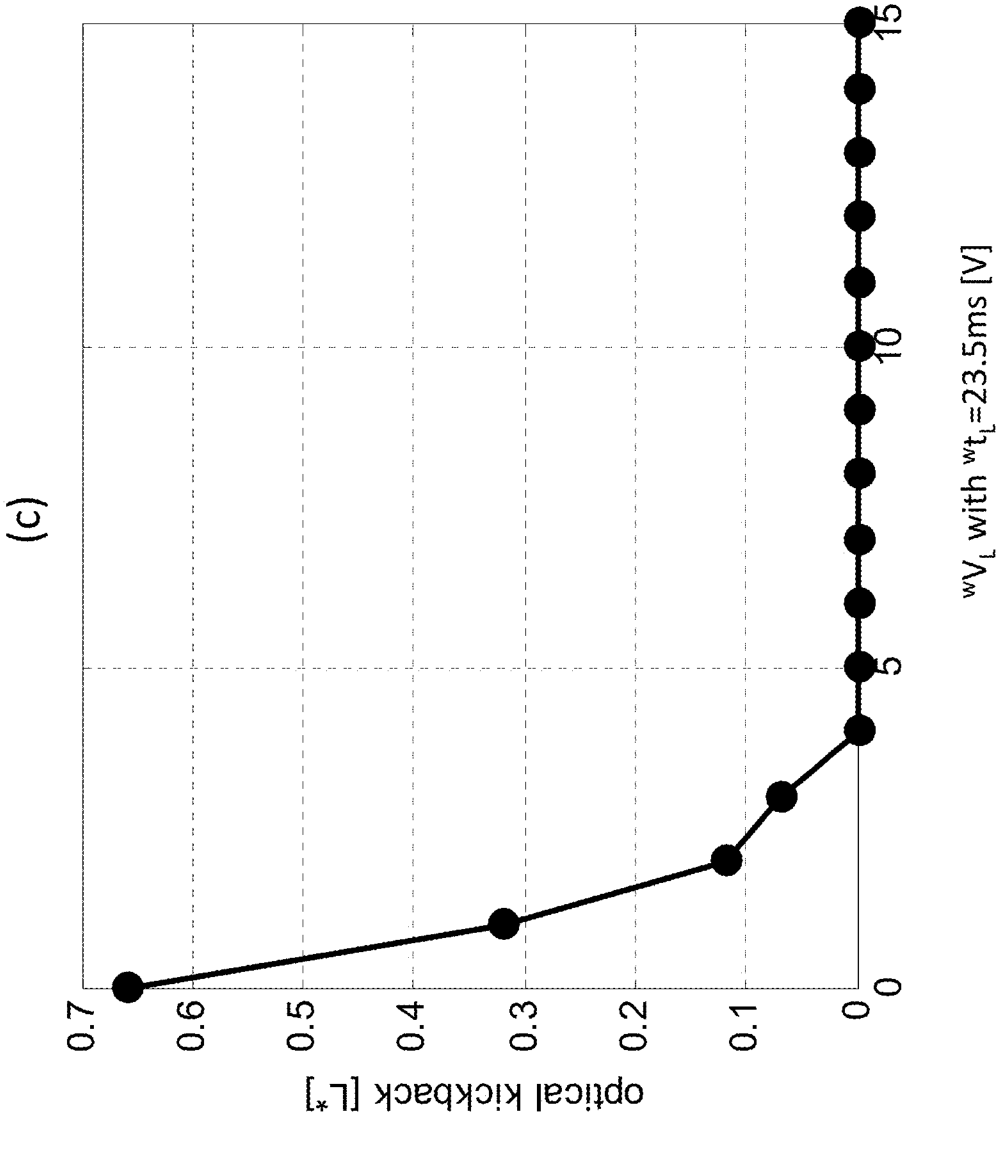
FIG. 11C illustrates the optical kickbacks as a function of the voltage ${}^{W}V_L$.

In some embodiments, values for ${}^{w}V_H$ and ${}^{w}t_H$ can be selected based on the plots shown in FIG. 11A, FIG. 11B, and FIG. 11C, which help illustrate tradeoffs between the values of ${}^{w}V_H$ and ${}^{w}t_H$ to achieve the desired optical rail. In some embodiments, a higher ${}^{w}V_H$ can increases ink speed and reduce the time ${}^{w}t_H$ to achieve the desired optical rail and vice versa. Selecting ${}^{w}V_H$ and ${}^{w}t_H$ may be determined based on desired maximum update time and desired white state rail requirements. Referring now to FIG. 11C, as an example, for a white to white drive with ${}^{w}V_H = 15$V and ${}^{w}t_H = 247.1$ ms, selecting a ${}^{w}V_L = 5$V can reduce optical kickback by more than 0.6 L* over a driving scheme in which the display pixel is shorted to 0V at the end of the driving waveform without reducing the drive voltage.

Figure 12:
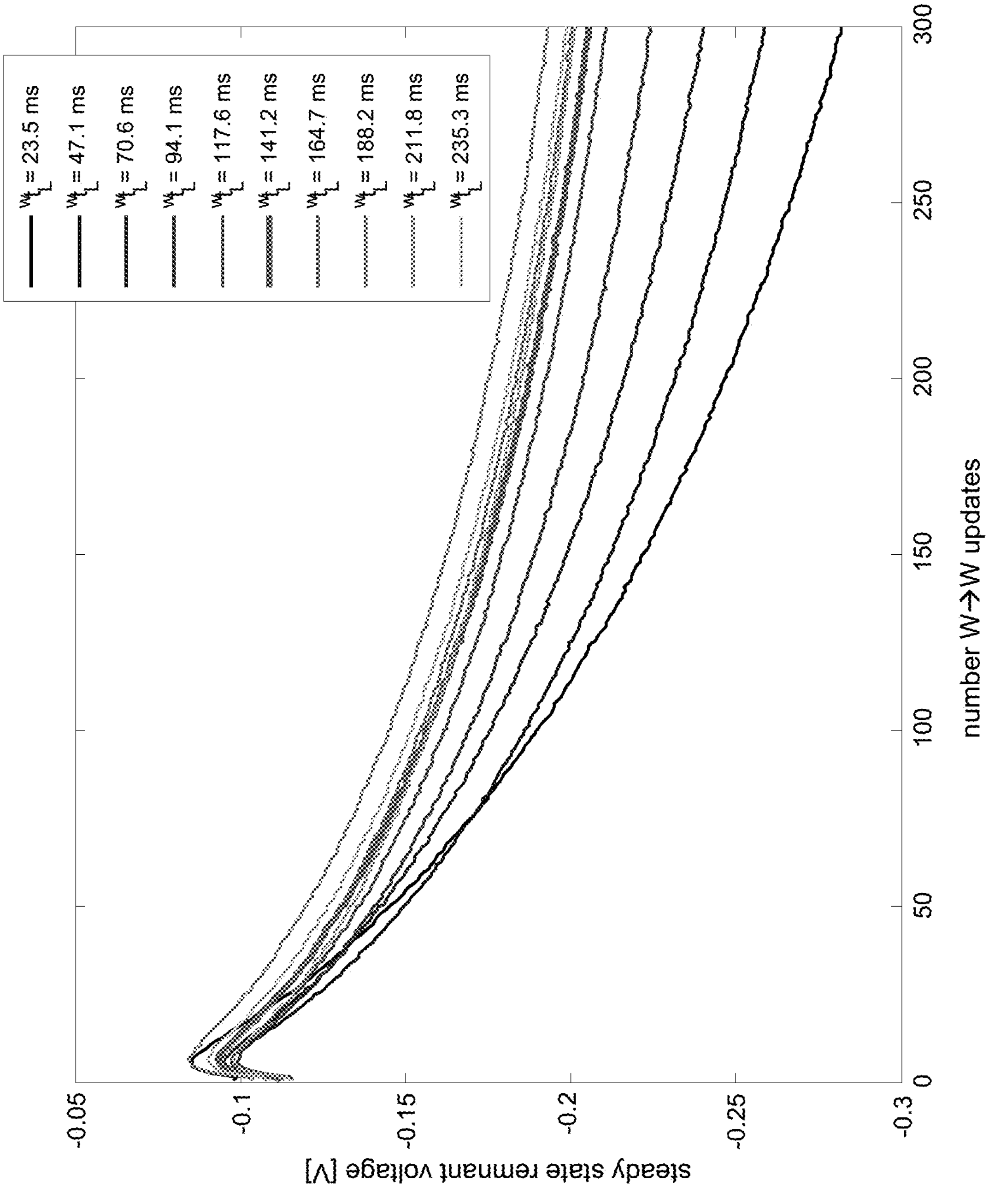
FIG. 12 illustrates a build-up of residual charges of a DC balanced white-to-white transition.

The same methodology with ${}^{b}V_L$ in the range of $0 < {}^{b}V_L \leq 10$V and ${}^{b}t_L > 20$ ms can be employed for the black rail. Furthermore, a minimized ${}^{w}t_L > 20$ ms and ${}^{b}t_L > 20$ ms may be selected such that the residual charge build-up on the module is minimized. A minimum ${}^{w}t_L$ and ${}^{b}t_L$ are desired here for this special waveform update to reduce impact on the total waveform update time. In some embodiments, a value for ${}^{w}t_L$ can be selected based on the plots shown in FIG. 12. FIG. 12 illustrates the residual change build-up in the electro-optic medium (as measured by the steady state remnant voltage) for different ${}^{w}t_L$ times. In one embodiment, selecting a ${}^{w}t_L = 141.2$ ms allows one to achieve a good tradeoff between minimizing the residual charge build-up and overall update time of the waveform.

In some embodiments, the selected (${}^{w}V_L$, ${}^{w}t_L$) pair may be fixed for a given ink platform at the end of a normal pulse drive dictated by the (${}^{w}V_H$, ${}^{w}t_H$) pair. Similarly the selected (${}^{b}V_L$, ${}^{b}t_L$) pair may be fixed for a given ink platform at the end of a normal pulse drive dictated by the (${}^{b}V_H$, ${}^{b}t_H$) pair. This configuration provides the flexibility to use rail voltage modulation (as given in the preceding implementation section) to achieve the desired low voltage setting with an active matrix display. In addition, an impulse potential in V·ms can be used as a measure to maintain DC balancing of the driving waveform, where this impulse potential may be defined as:

$$\text{impulse potential V·ms (drive pulse to white)} = {}^{w}V_H * {}^{w}t_H + {}^{w}V_L * {}^{w}t_L$$

$$\text{impulse potential V·ms (drive pulse to black)} = {}^{b}V_H * {}^{b}t_H + {}^{b}V_L * {}^{b}t_L$$

Finally, one may choose to keep the display pixels in an electrically floating state after the completion of a drive waveform.

Figure 13:
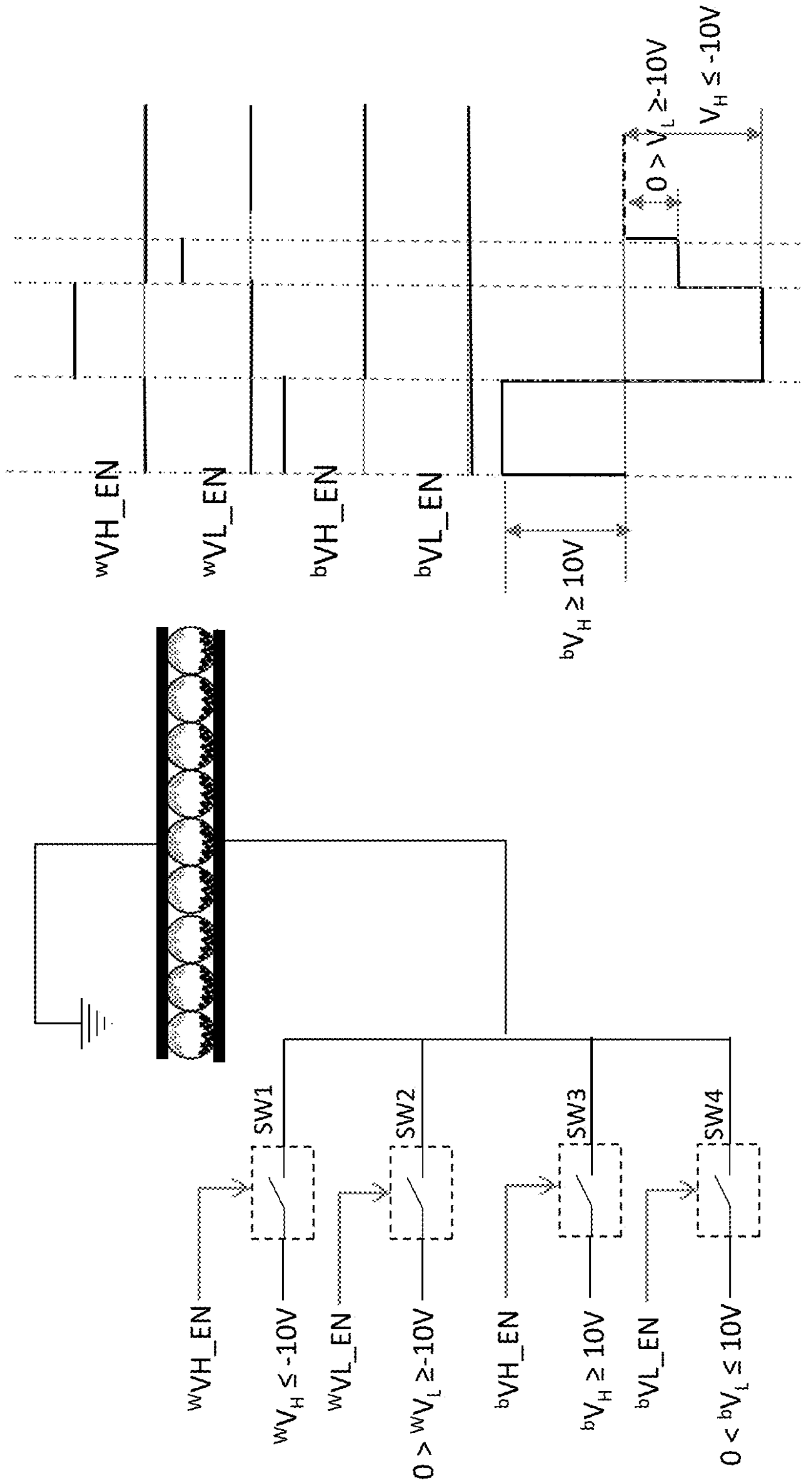
FIG. 13 illustrates one implementation of the driving methods presented herein.

In practice, the subject matter disclosed herein may be implemented as illustrated in FIG. 13. In some embodiments, the selection of ${}^{w}V_H$, ${}^{w}V_L$, ${}^{b}V_H$ and ${}^{b}V_L$ for ${}^{w}t_H$, ${}^{w}t_L$, ${}^{b}t_H$ and ${}^{b}t_L$ duration respectively may be controlled by switches SW1, SW2, SW3 and SW4 respectively. And floating may be achieved at the end of the drive by setting all the switches (SW1 to SW4) to an open state. For example, for an active matrix display, an exemplary waveform may be implemented by setting the ${}^{w}V_H$, ${}^{w}V_L$, ${}^{b}V_H$ and ${}^{b}V_L$ values for the ${}^{w}t_H$, ${}^{w}t_L$, ${}^{b}t_H$ and ${}^{b}t_L$ durations with ${}^{w}t_H$, ${}^{w}t_L$, ${}^{b}t_H$ and ${}^{b}t_L$ being multiples of the frame time, as described in U.S. Pat. No. 8,125,501, which is incorporated herein in its entirety, using voltage modulated driving systems. And then floating at the end of the low voltage drive can be achieved by using a high impedance switch on the VCOM_PANEL line to float the common electrode.

Figure 14:
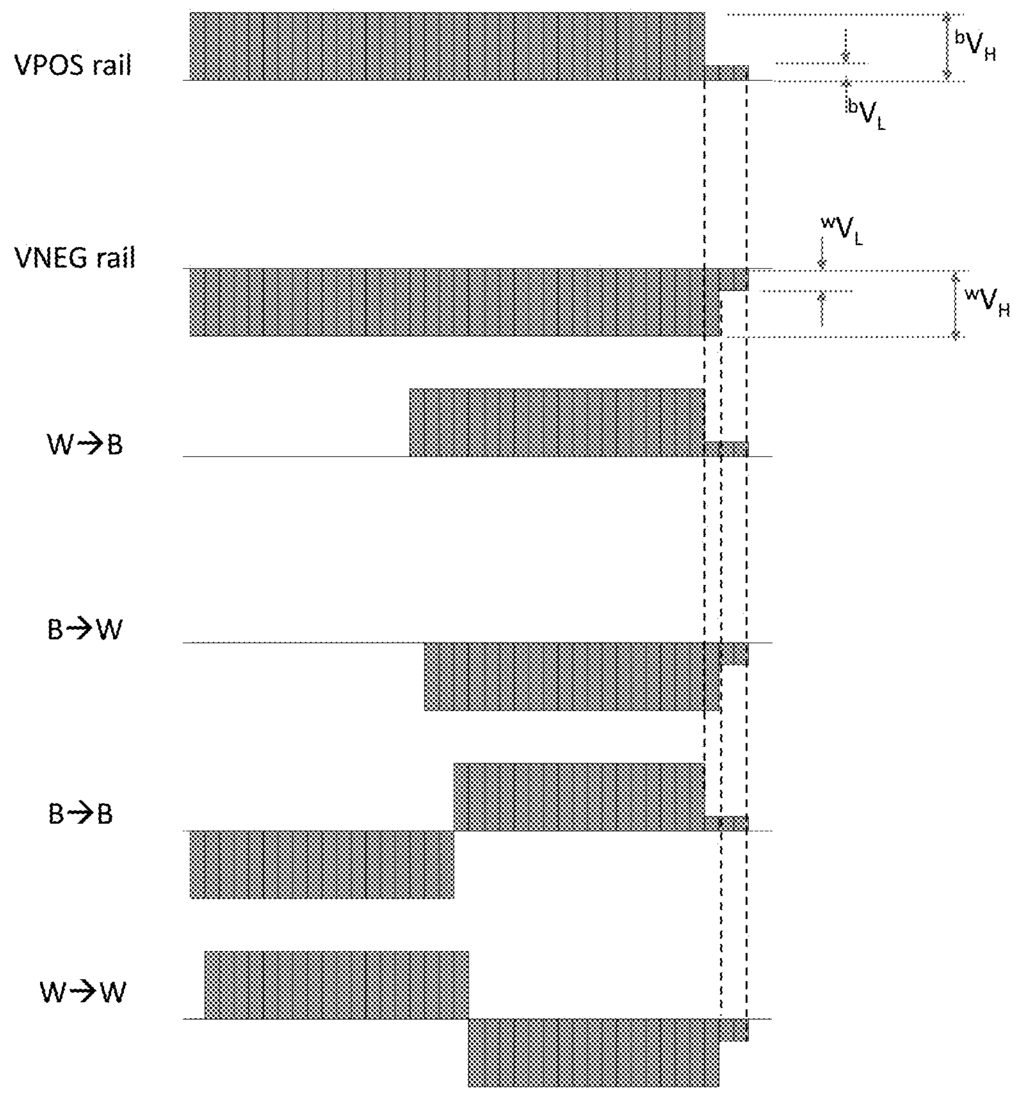
FIG. 14 illustrates one method to implement the waveforms presented herein.

In another embodiment, for an active matrix display, a waveform may be implemented by selecting ${}^{w}V_H$, ${}^{w}V_L$, ${}^{b}V_H$ and ${}^{b}V_L$ values for ${}^{w}t_H$, ${}^{w}t_L$, ${}^{b}t_H$ and ${}^{b}t_L$ durations with ${}^{w}t_H$, ${}^{w}t_L$, ${}^{b}t_H$ and ${}^{b}t_L$ being multiples of the frame time by modulating the supply rail voltages (i.e. VPOS and VNEG) as shown in FIG. 14. In this configuration, transition to intermediate graytones (other than to black and to white)

would be forced to i) select zero drives in frames where the $V_L$ is being modulated for VPOS and VNEG or ii) tuned the intermediate gray tones with consideration of a lower voltage at the end of the drive. And floating at the end of the low voltage drive may be achieved by using a high impedance switch on the VCOM_PANEL line to float the common electrode.

Figures 15A, 15B, 15C:
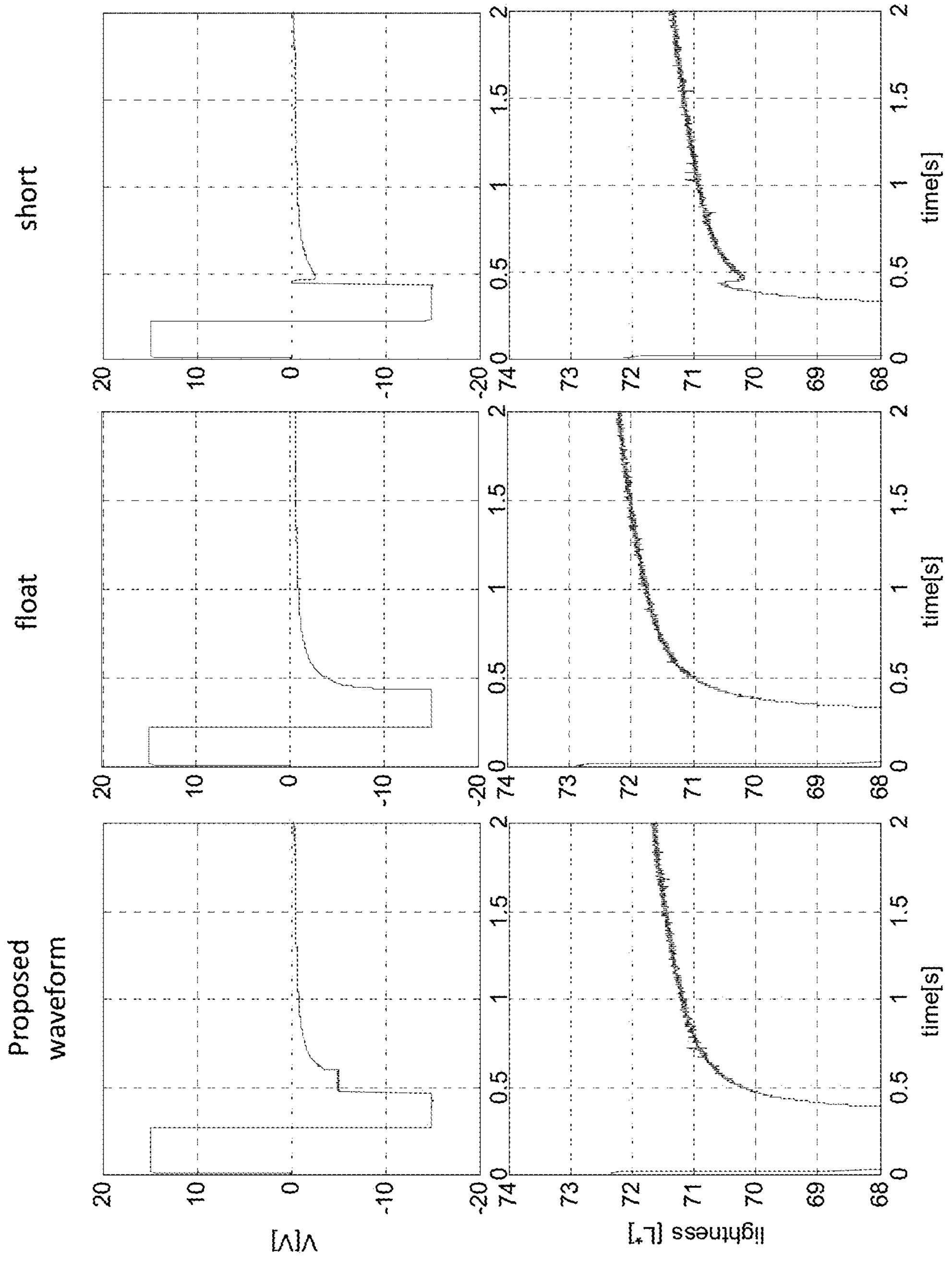
FIG. 15A illustrates voltages across an electro-optic medium and optical trace using the waveform presented herein.
FIG. 15B illustrates voltages across an electro-optic medium and optical trace with floating after an active drive.
FIG. 15C illustrates voltage across an electro-optic medium and optical trace with shorting after an active drive.

Referring now to FIGS. 15A-15C, which show a resulting shaped waveform in terms of optical performance and build-up of residual charge performance compared to the current default method of shorting at the end of the drive. In particular, FIG. 15A illustrates voltages across an electro-optic medium and optical trace using the waveform presented herein. FIG. 15B illustrates voltages across an electro-optic medium and optical trace with floating after an active drive. FIG. 15C illustrates voltage across an electro-optic medium and optical trace with shorting after an active drive.

Figure 15D:
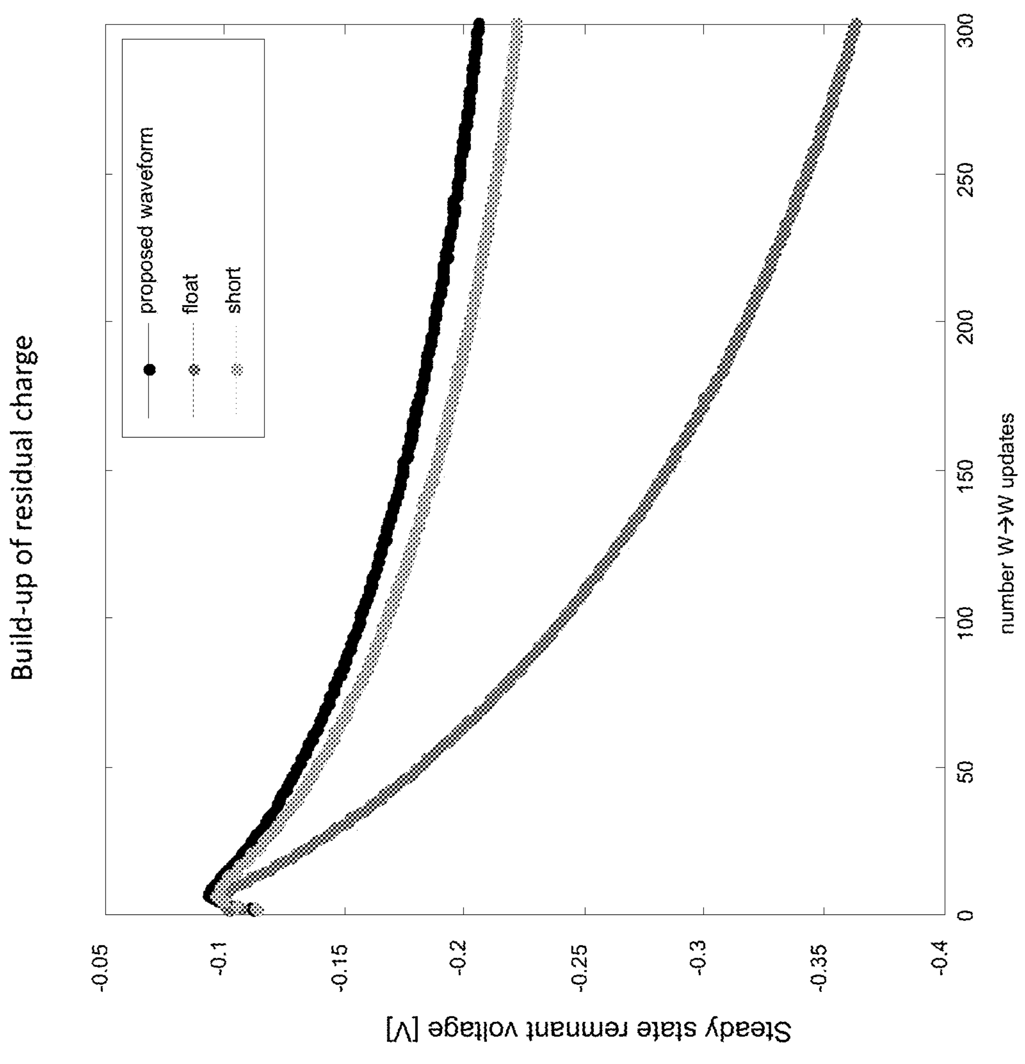
FIG. 15D illustrates the build-up of residual charges of a DC-balanced white-to-white transition.

FIG. 15D illustrates the build-up of residual charges of a DC-balanced white-to-white transition. The results show that the proposed method presented herein, when optimized properly, not only avoids optical kickback but also reduces build-up of residual charge as compared to the default method of shorting. Additionally, floating immediate after drive as shown in FIG. 15B and proposed by U.S. Pat. No. 7,034,783, which is incorporated herein in its entirety, while avoiding optical kickback will possibly have deleterious effects on the display after prolonged usage due to the build-up of residual charge.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method for driving an electro-optic display, the electro-optic display having a plurality of display pixels, wherein each of the plurality of display pixels is associated with a display transistor, the method comprising the following steps in order:

- applying a first voltage to a first display transistor associated with a first display pixel of the plurality of display pixels, wherein the first voltage is applied during at least one frame of a driving waveform;
- applying a second voltage to the first display transistor associated with the first display pixel,
  - wherein the second voltage has a non-zero amplitude less than the first voltage and is applied during the last frame of the driving waveform, and
  - wherein the amplitude of the second voltage is based on a voltage offset value and a sum of remnant voltages each frame of the driving waveform contributes to the first display pixel when the first voltage is applied to the first display transistor associated with the first display pixel.

2. The method of claim 1 wherein the duration of each frame of the driving waveform is substantially the same.

3. The method of claim 1 wherein the amplitude of the second voltage is further based on an amount of lightness of the first display pixel resulting from the driving waveform.

4. The method of claim 1 wherein the voltage offset value is based on a voltage contributed to the first display pixel due to a change in a gate voltage of the first display transistor and a parasitic capacitance of the first display transistor.

5. The method of claim 1 further comprising applying a third voltage to the first display transistor associated with the first display pixel, wherein the third voltage is substantially 0V.

6. The method of claim 1 wherein an amount of remnant voltage each frame of the driving waveform contributes to the first display pixel when the first voltage is applied to the first display transistor associated with the first display pixel is determined based on the amplitude of the first voltage and a remnant voltage coefficient corresponding to an amount of remnant voltage a frame of the driving waveform contributes to the display pixel.

7. The method of claim 6 further comprising determining the remnant voltage coefficients using an operational transconductance amplifier circuit model.

8. A method for driving a black-and-white electro-optic display to an optical rail state, the electro-optic display comprising an electrophoretic display medium electrically coupled between a plurality of display pixel electrodes and a common electrode, wherein each of the plurality of display pixel electrodes is associated with a display pixel, and wherein the electrophoretic display medium comprises a plurality of electrically charged black pigment particles and electrically charged white pigment particles, the method comprising the following steps in order:

- connecting a first display transistor associated with a first display pixel of the plurality of display pixels to a first voltage driver circuit by setting a first switching device in electrical communication with the first voltage driver circuit and a display pixel electrode associated with the first display pixel to a closed state, wherein the first voltage driver circuit is configured to provide a first voltage sufficient to drive the display pixel to an optical rail state, and wherein the first voltage is provided during one or more frames of a driving waveform;
- connecting the first display transistor associated with the first display pixel of the plurality of display pixels to a second voltage driver circuit configured to provide second voltage having a non-zero amplitude less than the first voltage for reducing an amount of remnant voltage the driving waveform contributes to the first display pixel, wherein the second voltage is provided after the one or more frames of the driving waveform; and
- placing the first display pixel in a floating state.

9. The method of claim 8 wherein the optical rail state comprises one of a substantially black state or a substantially white state.

10. The method of claim 8 wherein the electrophoretic display medium comprises only the plurality of electrically charged black pigment particles and electrically charged white pigment particles.

11. The method of claim 8 wherein the second voltage is provided for a period of time longer in duration than each frame of the driving waveform.

12. The method of claim 8 wherein the second voltage is provided for a period of time shorter in duration than each frame of the driving waveform.

13. The method of claim 8 wherein connecting the first display transistor associated with the first display pixel of the plurality of display pixels to the second voltage driver circuit comprises:

- setting the first switching device to an open state; and
- setting a second switching device in electrical communication with the second voltage driver circuit and the display pixel electrode associated with the first display pixel to a closed state.

14. The method of claim 13 wherein placing the first display pixel in a floating state comprises setting the second switching device to an open state.

15. The method of claim 13 wherein placing the first display pixel in a floating state comprises disconnecting an electrical connection between the common electrode and a ground voltage.

16. The method of claim 8 wherein the first voltage and the second voltage have the same polarity.

17. The method of claim 8 wherein the amplitude of the second voltage and a duration of time the second voltage is provided are based on an amount of lightness of the optical rail state resulting from the driving waveform.

* * * * *